(12) United States Patent
Kleiner et al.

(10) Patent No.: US 11,775,536 B2
(45) Date of Patent: Oct. 3, 2023

(54) INTELLIGENTLY IDENTIFYING AND GROUPING RELEVANT FILES AND PROVIDING AN EVENT REPRESENTATION FOR FILES

(71) Applicant: MICROSOFT TECHNOLOGY LICENSING, LLC, Redmond, WA (US)

(72) Inventors: Madeline Schuster Kleiner, Mercer Island, WA (US); Bernhard Kohlmeier, Seattle, WA (US); Jon Meling, Tromsø (NO); Jan Heier Johansen, Tromso (NO); Vegar Skjærven Wang, Tromsø (NO); Jignesh Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/881,830

(22) Filed: May 22, 2020

(65) Prior Publication Data
US 2021/0365466 A1    Nov. 25, 2021

(51) Int. Cl.
*G06F 16/2457* (2019.01)
*G06F 16/14* (2019.01)
(Continued)

(52) U.S. Cl.
CPC ........ *G06F 16/24578* (2019.01); *G06F 16/13* (2019.01); *G06F 16/156* (2019.01); *G06F 16/1734* (2019.01)

(58) Field of Classification Search
CPC .. G06F 16/24578; G06F 16/156; G06F 16/13; G06F 16/1734
See application file for complete search history.

(56) References Cited

U.S. PATENT DOCUMENTS 6,385,602 B1    5/2002   Tso et al.
6,507,845 B1 *  1/2003   Cohen .................... G06Q 10/10
                                                                707/608
(Continued)

FOREIGN PATENT DOCUMENTS

WO    2016081532 A1    5/2016
WO    2018102235 A1    6/2018

OTHER PUBLICATIONS

"International Search Report & Written Opinion issued in PCT Application No. PCT/US21/015971", dated Apr. 16, 2021, 12 Pages.

(Continued)

*Primary Examiner* — Kannan Shanmugasundaram
(74) *Attorney, Agent, or Firm* — NovoTechIP International PLLC

(57) ABSTRACT

A method and system for intelligently organizing one or more groups of relevant files may include retrieving a user data signal including user-specific data, analyzing the user data signal to identify a parameter relating to file relevance, identifying one or more relevant files in a storage medium based on the parameter at least one of a user category property, a lifecycle stage property, a relevant activity property, or an activity level property of one or more files in the storage medium, organizing the one or more relevant file into the one or more groups of relevant files, and providing for display data relating to the one or more groups of relevant files.

19 Claims, 14 Drawing Sheets

(51) Int. Cl.
    *G06F 16/17*     (2019.01)
    *G06F 16/13*     (2019.01)

(56) References Cited

U.S. PATENT DOCUMENTS

| | | | |
|---|---|---|---|
| 7,853,610 | B2 | 12/2010 | Hirsch et al. |
| 7,870,150 | B2 | 1/2011 | Hirsch et al. |
| 8,108,779 | B1 | 1/2012 | Rein et al. |
| 9,436,742 | B1 | 9/2016 | Hammad et al. |
| 10,042,615 | B2 | 8/2018 | Fredrickson et al. |
| 10,042,616 | B2 | 8/2018 | Fredrickson et al. |
| 11,138,534 | B1 * | 10/2021 | Kuhn ............... G06Q 10/06315 |
| 2005/0071328 | A1 | 3/2005 | Lawrence |
| 2005/0086255 | A1 * | 4/2005 | Schran ............... G06F 11/3495 707/999.102 |
| 2005/0278302 | A1 * | 12/2005 | Ritter ............... G06F 16/447 707/999.003 |
| 2007/0033187 | A1 | 2/2007 | Friedman et al. |
| 2007/0088690 | A1 | 4/2007 | Wiggen et al. |
| 2007/0265994 | A1 | 11/2007 | Ueda |
| 2008/0091656 | A1 | 4/2008 | Charnock et al. |
| 2008/0215616 | A1 | 9/2008 | Hirsch et al. |
| 2008/0281835 | A1 | 11/2008 | Hirsch et al. |
| 2009/0241183 | A1 * | 9/2009 | Boss ............... G06F 16/2379 715/255 |
| 2011/0066955 | A1 * | 3/2011 | Olson ............... H04L 51/28 715/752 |
| 2014/0033009 | A1 | 1/2014 | Rein et al. |
| 2015/0200893 | A1 | 7/2015 | Harris et al. |
| 2016/0371352 | A1 | 12/2016 | Kohlmeier et al. |
| 2016/0379129 | A1 | 12/2016 | Assem Aly Salama et al. |
| 2017/0139550 | A1 | 5/2017 | Milvaney et al. |
| 2017/0177610 | A1 | 6/2017 | Knotts et al. |
| 2017/0293864 | A1 | 10/2017 | Oh et al. |
| 2017/0357661 | A1 | 12/2017 | Hornkvist et al. |
| 2017/0365021 | A1 | 12/2017 | Stading et al. |
| 2018/0025084 | A1 | 1/2018 | Conlan et al. |
| 2018/0060325 | A1 | 3/2018 | Taylor et al. |
| 2018/0115603 | A1 | 4/2018 | Hu et al. |
| 2018/0367519 | A1 | 12/2018 | Johansen et al. |
| 2019/0034451 | A1 | 1/2019 | Nayak et al. |
| 2019/0179494 | A1 | 6/2019 | Colagrosso et al. |
| 2020/0067997 | A1 | 2/2020 | Hardee et al. |
| 2020/0097340 | A1 | 3/2020 | Balik et al. |
| 2020/0142545 | A1 | 5/2020 | Waid et al. |
| 2020/0159862 | A1 | 5/2020 | Kleiner et al. |
| 2020/0412676 | A1 | 12/2020 | Kau et al. |
| 2021/0118034 | A1 | 4/2021 | Indrakanti et al. |
| 2021/0224296 | A1 | 7/2021 | Kohlmeier et al. |
| 2021/0294809 | A1 | 9/2021 | Helvik et al. |
| 2021/0406449 | A1 | 12/2021 | Meling et al. |
| 2022/0222279 | A1 | 7/2022 | Kohlmeier et al. |
| 2022/0284031 | A1 | 9/2022 | Helvik et al. |
| 2022/0353307 | A1 | 11/2022 | Wang et al. |
| 2022/0405612 | A1 | 12/2022 | Kleiner et al. |

OTHER PUBLICATIONS

"International Search Report and Written Opinion Issued in PCT Application No. PCT/US2020/064980", dated Mar. 3, 2021, 10 Pages.
"Non-Final Office Action Issued in U.S. Appl. No. 16/917,655", dated Mar. 22, 2021, 16 Pages.
"Non Final Office Action Issued in U.S. Appl. No. 16/822,877", dated Aug. 3, 2021, 10 Pages.
"Notice of Allowance Issued in U.S. Appl. No. 16/917,655", dated Aug. 10, 2021, 6 Pages.
"Non Final Office Action Issued in U.S. Appl. No. 16/746,581", dated Jun. 30, 2021, 16 Pages.
"International Search Report and Written Opinion Issued in PCT Application No. PCT/US21/022863", dated Jun. 14, 2021, 10 Pages.
"International Search Report and Written Opinion Issued in PCT Application No. PCT/US21/028727", dated Jul. 14, 2021, 9 Pages.
"Notice of Allowance Issued in U.S. Appl. No. 17/243,285", dated Jul. 29, 2022, 7 Pages.
"Non Final Office Action Issued in U.S. Appl. No. 17/243,285", dated Apr. 6, 2022, 7 Pages.
"International Search Report & Written Opinion issued in PCT Application No. PCT/US22/023231", dated Jul. 1, 2022, 13 Pages.
"International Search Report and Written Opinion Issued in PCT Application No. PCT/US22/028881", dated Aug. 12, 2022, 11 Pages.
US-2022-0222279-A1, filed Jul. 14, 2022.
U.S. Pat. No. 11,321,360, filed May 3, 2022.
U.S. Pat. No. 11,392,594, filed Jul. 19, 2022.
U.S. Pat. No. 11,328,116, filed May 10, 2022.
U.S. Pat. No. 11,522,924, filed Dec. 6, 2022.
US-2022-0405612-A1, filed Dec. 22, 2022.
"Non-Final Office Action Issued in U.S. Appl. No. 17/827,324", dated Mar. 29, 2023, 13 Pages.
"Non Final Office Action Issued in U.S. Appl. No. 17/709,948", dated Jun. 30, 2023, 5 Pages.
"Notice of Allowance Issued in U.S. Appl. No. 17/827,324", dated Jul. 26, 2023, 9 Pages.

\* cited by examiner

| Session Start Time 210 | User ID 220 | User Activity Identifier 230 | Subject Matter 235 | Session End Time 240 |
|---|---|---|---|---|
| 2019-03-29 T 09:17:24.135Z | 3be14b38-121f-4c7a-85cf-cc5ee98f35e6 | 30002 | | 2019-03-29 T 09:23:35.115Z |
| | | 106 | | |
| | | 30010 | Air Pollution | |

| File Name 310 | Level of Activity 320 | Lifecycle Stage 330 | User Categories 340 | Session Date/Time 350 | Session Duration 360 | User ID 390 |
|---|---|---|---|---|---|---|
| New Hire Training | Active | Reading | Reader: user F | 2020-01-29 T 09:23:35 | 3:25:16 | 3be14b38-121f |
| | Active | Reading | Reader: user E | 2020-01-25 T 11:35:22 | 1:06:19 | 5ce14b38-125e |
| | Active | Reviewing | Reviewer: user D | 2019-12-21 T 10:15:42 | 0:25:45 | 3be14b38-121f |
| | Active | Editing | Editor: user C | 2019-12-18 T 12:34:15 | 1:34:11 | 7fb14b38-116d |
| | Very Active | Authoring | Author: user B | 2019-12-15 T 10:15:42 | 4:16:19 | 3be14b38-121f |
| | Very Active | Authoring | Author: user A | 2019-12-13 T 11:45:16 | 3:25:45 | 7fb14b38-116d |
| | Active | Creating | Creator: user A | 2019-12-13 T 10:15:44 | | 3be14b38-121f |

| File Name 310 | Relevant Activity 370 | Activity Time 380 | User ID 390 |
|---|---|---|---|
| New Hire Training | Content copied | 2020-01-29 T 09:23:35 | 3be14b38-121f-4c7a |
| | Document shared | 2020-01-25 T 11:35:22 | 3be14b38-121f-4c7a |
| | Link clicked | 2019-12-21 T 10:15:42 | 3be14b38-121f-4c7a |
| | Document shared | 2019-12-18 T 12:34:15 | 3be14b38-121f-4c7a |
| | Document printed | 2019-12-18 T 10:15:42 | 3be14b38-121f-4c7a |
| | Document presented | 2019-12-17 T 11:45:16 | 3be14b38-121f-4c7a |
| | Link clicked | 2019-12-15 T 10:15:44 | 3be14b38-121f-4c7a |

FIG. 3B

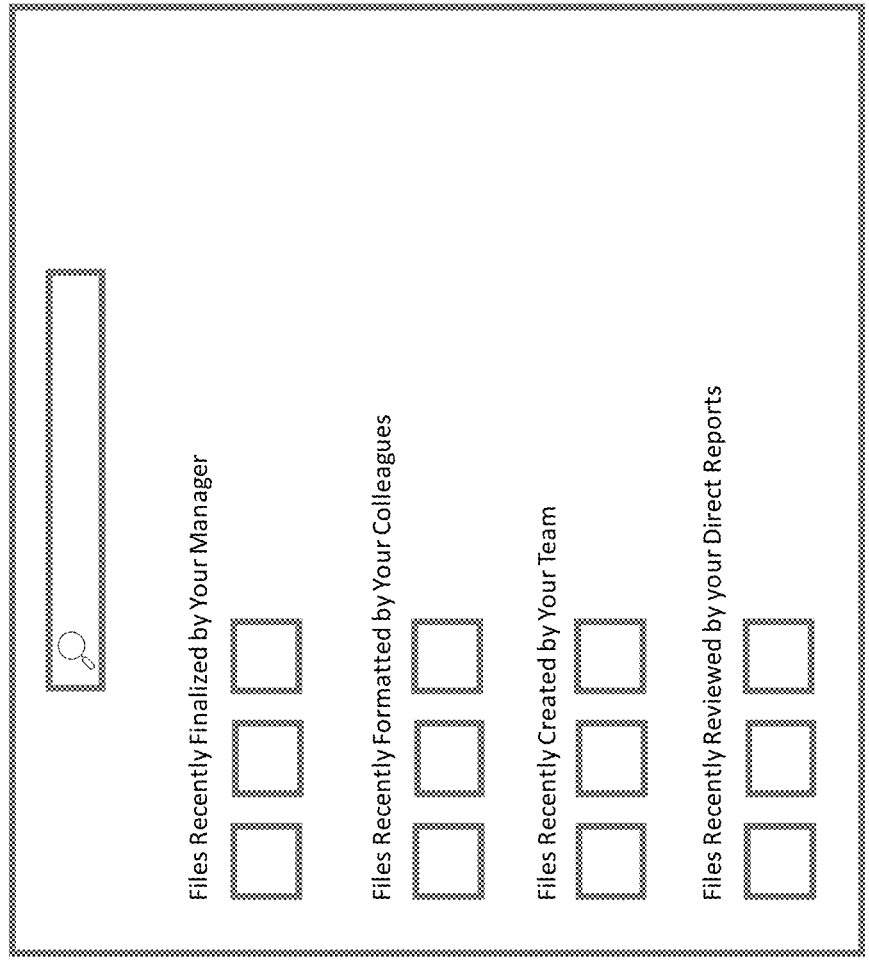

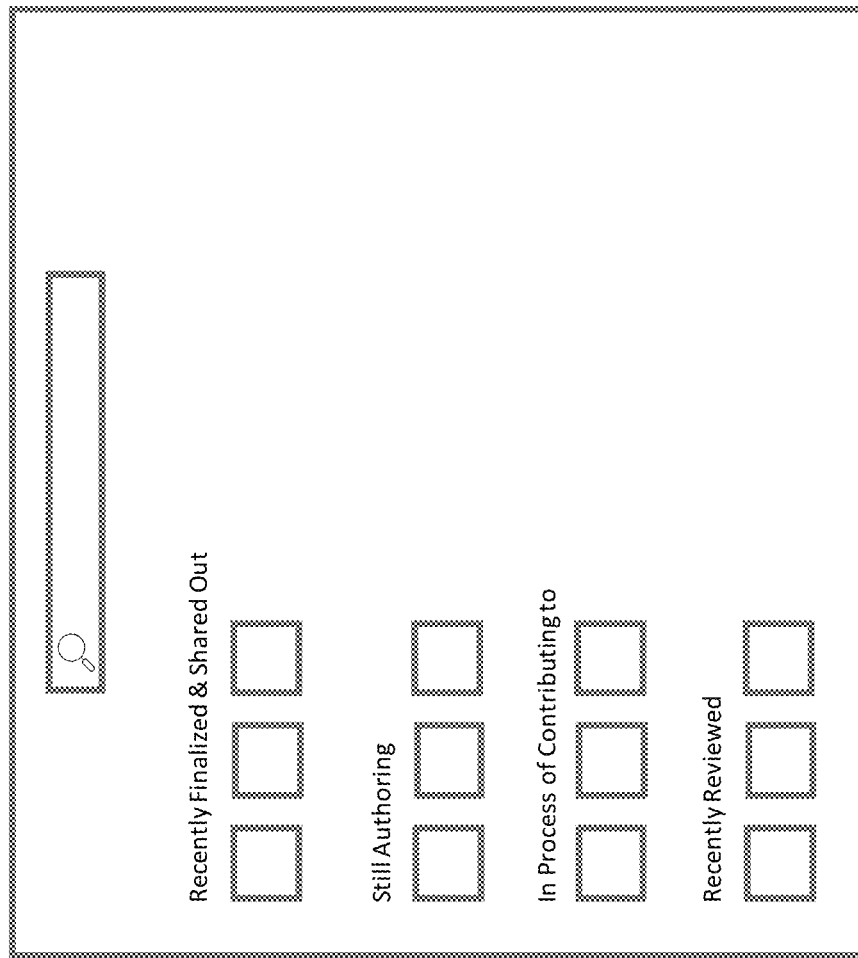

INTELLIGENTLY IDENTIFYING AND GROUPING RELEVANT FILES AND PROVIDING AN EVENT REPRESENTATION FOR FILES

BACKGROUND

Computer users often work on or access a significant number of electronic files while using a computing device. This is particularly true in enterprise settings, where users may work on, collaborate on and/or access a large number of files on a given day. Because of the large number of files available to users, it is often difficult for users to keep track of relevant files and updates thereto. For example, if a relevant file is modified by another person, it is unlikely that the user will discover the change without opening the file. Even then, the change may not be readily apparent (e.g., if a track changes setting is not used) and/or the person(s) who made the changes may not be identified. Furthermore, to quickly access a relevant file, the user would generally need to know the location at which the file is stored, remember the name of the file, browse to it, and/or perform a search to locate it. This may be time consuming and inefficient for the user. Moreover, the process of performing one or more searches to locate a relevant file may require significant memory, processor and bandwidth resources.

Furthermore, a file commonly goes through multiple lifecycle stages during which one or more users may contribute to the creation, preparation, review and/or formatting of the content contained in the file. In enterprises and collaborative work environments, each of these lifecycle stages may involve various actions performed by multiple users. The types of actions taken and the users who performed them may be important factors in examining and/or illustrating a history of the file. However, currently available file history information provides minimal information about the history of actions performed on the file. Thus, it may be challenging for users to find out the types of actions performed on a file and identify the persons who performed them. This may lead to user frustration and inefficiency.

Hence, there is a need for improved systems and methods of intelligently identifying relevant files, organizing the relevant files into groupings and providing richer illustrations of file histories.

SUMMARY

In one general aspect, the instant application describes a data processing system having a processor, an operating system and a memory in communication with the processor where the memory comprises executable instructions that, when executed by the processors, cause the device to perform multiple functions. The function may include retrieving a user data signal including user-specific data for identifying one or more groups of relevant files, analyzing the user data signal to identify a parameter relating to file relevance, identifying one or more relevant files in a storage medium based on the parameter and at least one of a user category property, a lifecycle stage property, a relevant activity property, or an activity level property of one or more files in the storage medium, organizing the one or more relevant files into the one or more groups, and providing for display data relating to the one or more groups.

In yet another general aspect, the instant application describes a method for intelligently organizing one or more groups of relevant files. The method may include retrieving a user data signal including user-specific data, analyzing the user data signal to identify a parameter relating to file relevance, identifying one or more relevant files in a storage medium based on the parameter and at least one of a user category property, a lifecycle stage property, a relevant activity property, or an activity level property of one or more files in the storage medium, organizing the one or more relevant files into the one or more groups, and providing for display data relating to the one or more groups.

In a further general aspect, the instant application describes a data processing system having a processor, an operating system and a memory in communication with the processor where the memory comprises executable instructions that, when executed by the processor, cause the data processing system to perform multiple functions. The function may include retrieving a plurality of properties for a file from a storage medium, the plurality of properties including at least one of a user category property, a user associated with the user category property, a time associated with the user category property, or a relevant activity performed on the file, analyzing the plurality of properties to identify one or more relevant events performed on the file, generating event data for at least one of the one or more relevant events, and providing the generated event data for presenting on a event representation for the file on a user interface of a computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an example data structure for keeping track of user activity in a file.

FIGS. 3A-3B illustrate example properties associated with a file that may be used to provide intelligent file grouping and/or displaying an event representation for the file.

FIGS. 4A-4B are example graphical user interface (GUI) screens for displaying groups of relevant files to a user.

DETAILED DESCRIPTION

Figure 1A:
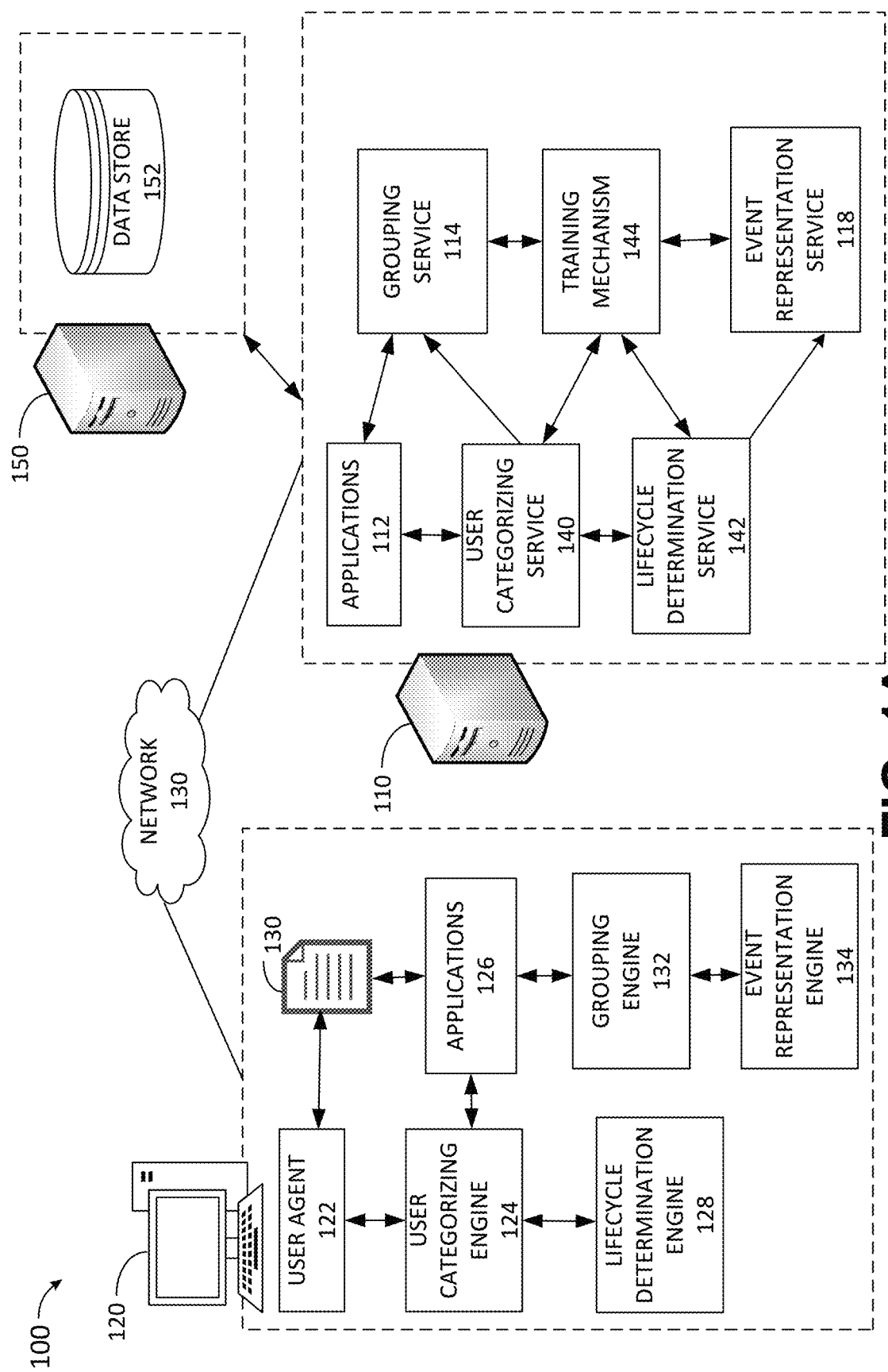
FIGS. 1A-1C illustrate an example system in which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Users of computing devices often access a significant number of electronic files on a daily basis. However, not all of those files are equally relevant to the user. As examples, a relevant file may be a file that the user or a person closely associated with the user has spent a significant amount of time actively interacting with in a given time period (e.g., the last week or the last month) and/or a file that the user may have an interest in because of the subject matter of the file. However, because of the large number of files users interact with (e.g., view, send and/or receive), it is often difficult to keep track of relevant files. Moreover, even if relevant files are identified, it is often challenging for the user to sort through the relevant files to determine their significance and how they are related to the user. This may result in the user having to spend a significant amount of time trying to locate relevant files or investigating why a file is relevant to the user or a work group or project associated with the user.

In order to present a list of relevant files to the user, conventional applications may provide a listing of recently saved and/or opened files. This list is, however, created simply based on information from recent access and/or saving of the file. Because of the prevalence of autosave and because not all files accessed and/or saved are equally relevant to a user, this list is often not an accurate representation of relevant files. Furthermore, the list often merely provides the names of files that have been recently accessed and/or saved by the user. As such, the list does not take into account any access or modifications made by other persons. As a result, such lists do not include all of the files that are relevant to a user and do not provide any information on updates made to relevant files by others. As a result, files identified in such lists may have the technical problem of being, at best, marginally relevant and as such the lists may not be reliable. This may require the user to perform one or more searches to locate their desired file or may cause the user to miss the desired file altogether, thus causing inefficiencies for both the user and the system.

Moreover, current file history information often provides limited information about the history of access and/or modifications to the file. The information often simply includes the user who first authored the file and the last user who modified the file. This does not provide any information about i) users who performed operations on the file between the file's creation and last access/modification, ii) the types of operations performed on the file and/or iii) the types of content accessed and/or modified in the file. Even if an activity log is provided that logs various users' access to the file, such logs often include minimal information. These activity logs do not provide information regarding the types of actions taken with respect to the file by different users. Thus, it may be challenging for users to find out the types of actions performed on a file and identify the persons who performed them. This may lead to frustration as well as inefficiency for the user and the system.

To address these technical problems and more, in an example, this description provides a technical solution for intelligently identifying and grouping relevant files based on their relevance to the user and for providing an event representation for the files. The event representation may include a textual and/or graphical representation that details relevant actions taken by the user and/or by other users with respect to the file. To provide the event representation, techniques may be used for evaluating user relationships, relevant file activities performed on the file by the user and/or by other users, and the lifecycle stage of the file. To achieve this, information about users' activities in a file may be collected. This information may then be analyzed to determine one or more user categories associated with the file based on users' activities, identify certain activities that are useful for relevance ranking, determine the activity level and/or lifecycle stage of the file, and identify activity patterns for the user. The determined data may then be transmitted for storage with the file and/or in a data structure associated with the user or the file. File-specific data may be stored as metadata for the file and/or may be added as new properties to the file such that it can be accessed during grouping, relevance ranking and/or providing an event representation.

As will be understood by persons of skill in the art upon reading this disclosure, benefits and advantages provided by such implementations can include, but are not limited to, a solution to the technical problems of inability to accurately identify relevant files, lack of organizational mechanisms for arranging the relevant files based on their relevance, and lack of detailed, accurate and/or relevant history information for a given file. Technical solutions and implementations provided herein optimize and improve the accuracy of identifying relevant files by using detailed usage signals. This leads to providing more accurate and reliable file groups to users in need of locating files quickly and efficiently. The files included in these file groups are more likely to be relevant to the user, thus increasing the precision with which relevant files are identified. The benefits provided by these solutions provide more user-friendly applications and enable users to increase their efficiency. Furthermore, because more relevant files are identified and grouped in a manner that is related to the user's needs, the solutions may reduce the number of searches conducted to locate a desired file. This can significantly reduce processor, memory and/or network bandwidth usage and increase efficiency.

As a general matter, the methods and systems described here may include, or otherwise make use of, a machine-trained model to identify data related to a file. Machine learning (ML) generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model in order to identify patterns in user activity, determine associations between tasks and users, identify categories for a given user, and/or identify activities associated with file relevance and grouping. Such training may be made following the accumulation, review, and/or analysis of user data from a large number of users over time. Such user data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

FIG. 1A illustrates an example system 100, in which aspects of this disclosure may be implemented. The system 100 may include a sever 110 which may contain and/or execute a user categorizing service 140, a lifecycle determination service 142, a grouping service 114 and an event representation service 118. The server 110 may operate as a shared resource server located at an enterprise accessible by various computer client devices such as client device 120. The server 110 may also operate as a cloud-based server for offering global user categorizing services, lifecycle determination services, grouping services and/or event representation services. Although shown as one server, the server 110 may represent multiple servers for performing various different operations. For example, the server 110 may include one or more processing servers for performing the operations of the user categorizing service 140, the lifecycle determination service 142, the grouping service 114 and the event representation service 118.

The user categorizing service 140 may provide intelligent categorization of users' roles with respect to a file over time. As described in detail with respect to FIG. 1B, the operations of the user categorization service may include receiving a usage signal from a file, determining based on the information provided in the usage signal one or more user categories for the user, identifying certain activities performed on the content of the file that may be relevant to grouping services and providing the identified user categories and relevant file activities for storage in association with the file. As described further with respect to FIG. 2, the usage signal may include detailed information about the types of activities performed on a file by a user within a given time period.

The lifecycle determination service 142 may provide intelligent determination of a file's lifecycle stage and/or activity level. As described in detail with respect to FIG. 1B, the lifecycle determination service 142 may receive information relating to the one or more user categories identified by the user categorizing service 140 and determine based on the identified user categories an appropriate lifecycle stage for the file. Furthermore, the lifecycle determination service 142 may determine an appropriate activity level for the file based on the activities received as part of the usage signal.

The grouping service 114 may conduct intelligent identification and grouping of relevant files. As described in detail with respect to FIG. 1B, the grouping service 114 may first conduct a search of one or more data stores to identify relevant files. After identifying the relevant files, the grouping service 114 may organize the identified relevant files into one or more groups associated with the user based on the identified files' history of user categories, lifecycle stages and/or activity levels, among other factors. A list of the organized relevant files may then be provided by the grouping service 114 for being displayed to the user.

The event representation service 118 may provide intelligent event representation for a file. As described in detail with respect to FIG. 1B, the event representation service 118 may first retrieve a history of user categories, lifecycle stages and/or activity levels associated with the file, and then evaluate the historical data to identify events that are significant and/or relevant to the user or file for which the event representation is being performed. The identified relevant events may then be displayed on an event representation for the file. The event representation may be specific to the user (e.g., display events associated with the user) and/or may include relevant events that are associated with other users.

In collecting, storing, using and/or displaying any user data, care must be taken to comply with privacy guidelines and regulations. For example, options may be provided to seek consent (e.g., opt-in) from users for collection and use of user data, to enable users to opt-out of data collection, and/or to allow users to view and/or correct collected data.

The server 110 may be connected to or include a storage server 150 containing a data store 152. The data store 152 may function as a repository in which files and/or data sets (e.g., training data sets) may be stored. One or more ML models used by the user categorizing service 140, the lifecycle determination service 142, the grouping service 114, and the event representation service 118 may be trained by a training mechanism 144. The training mechanism 144 may use training data sets stored in the data store 152 to provide initial and ongoing training for each of the models. Alternatively or additionally, the training mechanism 144 may use training data sets from elsewhere. This may include training data such as knowledge from public repositories (e.g., Internet), knowledge from other enterprise sources, or knowledge from other pre-trained mechanisms. In one implementation, the training mechanism 144 may use labeled training data from the data store 152 to train each of the models via deep neural network(s) or other types of ML models. The initial training may be performed in an offline stage. Additionally and/or alternatively, the one or more ML models may be trained using batch learning.

It should be noted that the ML model(s) categorizing the user activities, determining lifecycle stages, grouping files and/or providing event representation may be hosted locally on the client device 120 or remotely, e.g., in the cloud. In one implementation, some ML models are hosted locally, while others are stored remotely. This enables the client device 120 to provide some categorization, lifecycle determination, grouping and/or event representation, even when the client is not connected to a network.

The server 110 may also be connected to or include one or more online applications 112. Applications 112 may be representative of applications that enable a user to interactively generate, edit and/or view the electronic file 130 and/or to enable the user to access information related to one or more files. As such, applications 112 may include an application hosted by the grouping service 114 and/or event representation service 118. Examples of suitable applications include, but are not limited to, a file management application, a file sharing application, a word processing application, a presentation application, a note taking application, a text editing application, an email application, a spreadsheet application, a desktop publishing application, a digital drawing application, a communications application and a web browsing application.

A client device 120 may be connected to the server 110 via a network 130. The network 130 may be a wired or wireless network(s) or a combination of wired and wireless networks that connect one or more elements of the system 100. In some embodiments, the client device 120 may be a personal or handheld computing device having or being connected to input/output elements that enable a user to interact with an electronic file 130 on the client device 120 and to view information about one or more files relevant to the user via, for example, a user interface (UI) displayed on the client device 120. Examples of suitable client devices 120 include but are not limited to personal computers, desktop computers, laptop computers, mobile telephones, smart phones, tablets, phablets, digital assistant devices, smart watches, wearable computers, gaming devices/computers, televisions, and the like. The internal hardware structure of a client device is discussed in greater detail with regard to FIGS. 8 and 9.

The client device 120 may include one or more applications 126. An application 126 may be a computer program executed on the client device that configures the device to be responsive to user input to allow a user to interactively generate, edit and/or view the electronic file 130 and/or to enable the user to access information related to one or more files. The electronic file 130 and the term file used herein can be representative of any electronic file that can be created by a computing device and/or stored in a storage medium. Examples of files include but are not limited to word-processing files, presentations, spreadsheets, websites (e.g., SharePoint sites), digital drawings, emails, media files and the like. The electronic file 130 may be stored locally on the client device 120, stored in the data store 152 or stored in a different data store and/or server.

The applications 126 may process the electronic file 130, in response to user input through an input device, to create, view and/or modify the content of the electronic file 130. The applications 126 may also display or otherwise present display data, such as a graphical user interface (GUI), which includes the content of the electronic file 130, to the user. In another example, the applications 126 may enable the user to view a list of relevant files and/or view an event representation for a file. Examples of suitable applications include, but are not limited to a file management application, a file sharing application, a word processing application, a presentation application, a note taking application, a text editing application, an email application, a spreadsheet application, a desktop publishing application, a digital drawing application and a communications application.

The client device 120 may also access applications 112 that are run on the server 110 and provided via an online service, as described above. In one implementation, applications 112 may communicate via the network 130 with a user agent 122, such as a browser, executing on the client device 120. The user agent 122 may provide a UI that allows the user to interact with application content and electronic files stored in the data store 152 via the client device 120. The user agent 122 may also provide a UI that enables the user to view a list of one or more files and/or view an event representation for a file. In some examples, the user agent 122 may be a dedicated client application that provides a UI to access files stored in the data store 152 and/or in various other data stores.

In one implementation, the client device 120 may also include a user categorizing engine 124 for categorizing a user's roles with respect to files, such as the electronic file 130, and/or identifying relevant file activities performed in the files. In an example, the local user categorizing engine 124 may operate with the applications 126 to provide local user categorizing services. For example, when the client device 120 is offline, the local user categorizing engine 124 may operate in a similar manner as the user categorizing service 140, and may use one or more local repositories to provide categorization of user activities for a file. In one implementation, enterprise-based repositories that are cached locally may also be used to provide local user categorization. In an example, the client device 120 may also include a lifecycle determination engine 128 for determining the current lifecycle stage and/or activity level of a file, such as the electronic file 130. The lifecycle determination engine 128 may use the amount and/or types of activities performed on the file within a given time period along with the identified user categories (e.g., received from the local user categorizing engine 124 and/or the user categorizing service 140) to determine the current lifecycle stage and/or activity level of the file. The operations of the lifecycle determination engine 128 may be similar to the operations of the lifecycle determination service 142, which are discussed below with respect to FIG. 1B.

Moreover, the client device 120 may include a grouping engine 132, as well as an event representation engine 134. The grouping engine 132 may conduct intelligent identification and grouping of relevant files (e.g., locally stored files). To achieve this, the grouping engine 132 may conduct a search of one or more local data stores to identify relevant files. After identifying the relevant files, the grouping engine 132 may organize the identified files into one or more groups associated with the user, and then provide information for displaying the one or more groups to the user. The operations of the grouping engine 132 may be similar to the operations of the grouping service 114, which are discussed below with respect to FIG. 1B.

The event representation engine 134 may use the history of user categories, lifecycle stages and/or activity levels of a file of interest to identify relevant events for the file. The identified events may then be used to generate an event representation for the file. The operations of the event representation engine 134 may be similar to the operations of the event representation service 118, which are discussed below with respect to FIG. 1B.

In one implementation, in order to identify relevant files, the client device 120 may include a local search service for conducting a search for relevant files stored in a local storage medium (e.g., local memory of the client device 120, not shown). The search service may include a local ranking engine and/or a local search engine. Alternatively, the local search service may make use of a remote ranking engine and/or search engine for conducting a search of the local storage medium and/or ranking the identified search results for relevance.

User categorizing service 140, lifecycle determination service 142, user categorizing engine 124, and lifecycle determination engine 128, may receive usage signals from files created or edited in a variety of different types of applications 126 or 112. Once usage signals are received, the user categorizing service 140, lifecycle determination service 142, user categorizing engine 124, and lifecycle determination engine 128 may evaluate the received usage signals, regardless of the type of application they originate from, to identify appropriate user categories and/or lifecycle stages associated with the usage signals. Each of the grouping service 114, user categorizing service 140, lifecycle determination service 142, event representation service 118, user categorizing engine 124, lifecycle determination engine 128, grouping engine 132 and event representation engine 134 may be implemented as software, hardware, or combinations thereof.

Figure 1B:
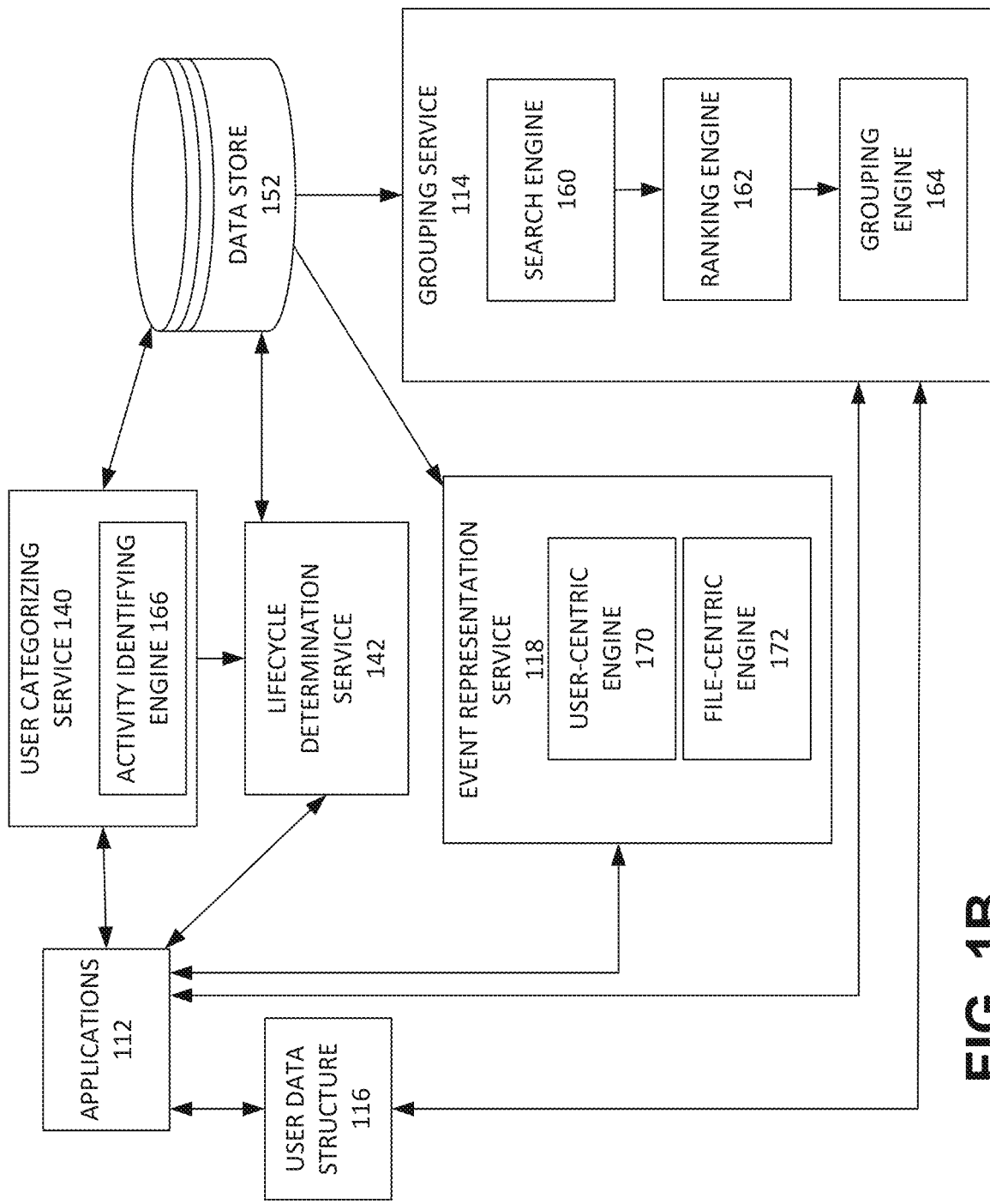

FIG. 1B depicts various elements included in each of the lifecycle determination service 142, grouping service 114 and event representation service 118. The user categorizing service 140 may receive data related to activities performed in a file and identify user categories associated with the activities for a given session. To achieve this, users' roles with respect to the file may be identified for the session. This process is discussed in detail in U.S. patent application Ser. No. 16/746,581, entitled "Intelligently Identifying a User's Relationship with a Document," and filed on Jan. 17, 2020 (referred to hereinafter as "the '581 Application"), the entirety of which is incorporated herein by reference.

As discussed in the '581 Application, content creation/editing applications often provide numerous commands and/or other activities for interacting with contents of a file. For example, a word processing application may include one or more commands for changing the font, changing paragraph styles, italicizing text, and the like. These commands may each be associated with an identifier, such as a toolbar command identifier (TCID). In addition to offering various commands, applications may also enable user activities such as typing, scrolling, dwelling, or other tasks that do not correspond to TCID commands. These activities may be referred to as non-command activities. Each of the commands or non-command activities provided by an application may fall into a different category of user activity. For example, commands for changing the font, paragraph, or style of the file may be associated with formatting activities, while inserting comments, replying to comments and/or inserting text using a track-changes feature may correspond to reviewing activities.

To categorize user activities, commands and non-command activities provided by an application, such as applications 112, may be grouped into various user categories. An initial set of user categories may include creators, authors, moderators, reviewers, and readers. Other categories may also be used and/or created (e.g., custom categories created for an enterprise or tenant). For example, a category may be generated for text formatters. Another category may be created for object formatters (e.g., shading, cropping, picture styles). Yet another category may be created for openers, which may include users who merely open and close a file or open a file but do not perform any activities (e.g., scrolling) and do not interact with the content of the file.

To determine user categories and/or identify user activities that relate to file relevance, data representing user commands used to interact with the content of the file may be collected and analyzed. This may involve tracking and storing (e.g., temporarily) a list of user activities and commands in a local or remote data structure associated with the file to keep track of the user's activity and command history. This information may be referred to as a usage signal and may be provided by the applications 112 (e.g., at the end of an active session) to the user categorizing service 140, which may use the information to determine which user category or categories the user activities fall into. For example, the user categorizing service 140 may determine that based on the user's activity and command history within the last session, the user functioned as a reviewer. Identification of the user category or categories may be made by utilizing an ML model that receives the usage signal as an input and intelligently identifies the proper user categories for each user session. The identified user category may then be returned to the applications 112 and/or to the data store 152 where it may be stored as metadata for the file and/or be added as new properties to the file for use during searching, relevance ranking, grouping and/or generating an event representation.

In addition to identifying the user categories for each session, the user categorizing service 140 may utilize an activity identifying engine 166 to examine the list of user activities performed in the file and identify activities that may be related to file relevance. File relevance may refer to the importance and/or usefulness of the file to a given user. Certain activities performed on the file may signify its relevance. These activities may be referred to as relevant file activities. In an example, clicking on a link within the file, copying content (e.g., text, drawings, or images) from the file or pasting into it, printing the file, or presenting the file in a meeting may indicate that the file was useful and/or of significance to the user. Thus, when such actions have been taken with respect to the file, the likelihood that the file may be relevant to the user or other users may be increased. In some implementations, relevant file activities vary from file to file and/or from one file type to another file type. For example, performing a copy/paste operation may be more important in a word processing type of file than in a spreadsheet type of file.

To take relevant file activities into account, a number of relevant file activities may first be identified. In one implementation, this is achieved by utilizing one or more ML models. For example, when a list of files is presented to users, user feedback (e.g., explicit feedback or implicit feedback such as usage data) may be collected to determine which files in the list the users found most relevant. The user feedback may provide an initial and ongoing training data set that is updated as more information is collected. In one implementation, this may involve collecting and using information that may be relevant to individual users. For example, different activities may signify different levels of importance for each user. User interactions with search results and/or lists of files that are presented to them may thus be collected and examined to provide personalized relevance determinations for each user.

In some implementations, for additional accuracy and precision, the ML models may include a personalized model, a global model and/or a hybrid model. For example, some activities may be determined to be relevant file activities across the population. For those activities, a global model may be used to identify the relevant file activities. The global model may identify relevant file activities for a large number of users and use the identified relevant file activities for all users. Other activities may only be relevant to specific users. For example, if a user often changes the font after opening a file or often searches for files presented in meetings, changing the font or presenting the file in a meeting may be considered relevant file activities for that user. A personalized model can identify such personalized relevant file activities. A hybrid model may be used to identify relevant file activities for users that are associated with and/or similar to the user. By using a combination of personalized, hybrid and/or global models, more relevant file activities may be identified for a given user.

In addition to utilizing the user's data to train the ML models disclosed herein, data from other users that are similar to the current user may also be used. For example, in identifying relevant file activities, the ML model may use feedback data from users with similar activities, similar work functions and/or similar work products to the user. The data consulted may be global or local to the current device.

In collecting and storing any user activity data and/or user feedback, care must be taken to comply with privacy guidelines and regulations. For example, user feedback may be collected and/or stored in such a way that it does not include user identifying information and is stored no longer than necessary. Furthermore, options may be provided to seek consent (e.g., opt-in) from users for collection and use of user data, to enable users to opt-out of data collection, and/or to allow users to view and/or correct collected data.

Using ML models that are offered as part of a service (e.g., the user categorizing service 140) may ensure that the list of relevant file activities can be modified iteratively and efficiently, as needed, to continually train the models. However, a local relevant activity identifying engine may also be provided. Alternatively or additionally, instead of operating as part of the user categorizing service 140, the activity identifying engine 166 may function as a separate service. When a separate activity identifying service or local engine is used, the usage signal may be sent to the activity identifying service or local engine, such as at the same time it is sent to the user categorizing service.

Once the list of relevant file activities has been generated and/or modified (e.g., the ML model has been trained), the activity identifying engine 166 may compare the list of relevant file activities against the list of user activities received as part of the usage signal to determine if any activities performed on the file are on the list of relevant file activities. After relevant file activities are identified for a session associated with the usage signal, they may be provided by the activity identifying engine 166 and may be transmitted along with, as part of, or separately from a user category signal to a storage medium such as the data store 152 for storage. Both the user category signal and the relevant file activities may be stored for future use in determining file relevance.

The user category signal may a signal that includes the one or more user categories identified for a session. The user category signal may also be transmitted from the user categorizing service 140 and/or sent from the data store 152 to the lifecycle determination service 142. The lifecycle determination service 142 may utilize the identified user category and/or the underlying user activities to determine an appropriate lifecycle stage for the file. For example, when the identified user category is a reviewer, the lifecycle determination service 142 may determine that the current lifecycle stage of the file is in review. In an example, lifecycle stages include creation, authoring, editing, in review, and/or finalized.

In addition to the user category signal, the lifecycle determination service 142 may receive data relating to the types and quantity of activities performed in the file within a given time period (e.g., the last active session or the last few active sessions). This data may be provided by the user categorizing service 140, applications 112 and/or the data store 152. The lifecycle determination service 142 may use the activity data to determine a level of activity for the file. This may be done by examining the number or degree of activities performed within a given period and determining where the activity level falls among a variety of predetermined levels of activity (e.g., non-active, low activity, active, very active, extremely active).

To determine the level of activity, in addition to the number or degree of activities performed, the types of activities may also be taken into consideration. Some activities may be more important than others within the context of the application. For example, in a word-processing application, pressing the delete button multiple times to delete a sentence may result in a larger number of activities than pasting a paragraph into the file. However, pasting the paragraph may be more important or substantial than deleting a sentence. To address this, different weights may be assigned to each activity in an application. The weights may be predetermined or may be set by one or more ML models used to identify the importance of each activity within the application. In some embodiments, once the weights are determined, the lifecycle determination service 142 may calculate a weighted sum of the activities. The weighted sum may then be compared to predetermined activity levels (e.g., non-active, low activity, active, very active, extremely active) to determine which activity level the weighted sum falls into.

It should be noted that the level of activity may change with time. For example, a file may have been identified as very active the last time it was modified. That same file may not be used for an extended period of time after the last modification. To more accurately capture the current activity level of the file, in one implementation, a mechanism is used that considers both the level of activity and the amount of time that has passed since the last activity and updates the activity level accordingly. Once calculated and/or updated, the activity level may then be provided by the lifecycle determination service 142 to the applications 112 or to the data store 152 to be stored as metadata associated with the file.

The identified user categories, lifecycle stages and/or activity levels may then be used as inputs to enable the grouping service 114 to identify and organize relevant files. In some implementations, an indication may be received from an application 112 to present a list of relevant files to the user. This may occur when a user launches a specific application and/or invokes a menu item in an application, such as applications 112.

When such an indication is received from the application(s) 112, the grouping service 114 may retrieve from the user data structure 116, which may be stored locally (e.g., in the client device 120), in the data store 152 and/or in any other storage medium, user-specific information that can be used in identifying relevant files. This may include information about the user, in addition to people, teams, groups, organizations and the like that the user is associated with. In an example, the user-specific information may include one or more people the user has recently collaborated with (e.g. has exchanged emails or other communications with, has had meetings with, or has worked on the same file with). In another example, the user-specific information may include people on the same team or group as the user, and/or people working on a same project as the user. The user-specific information may also include the degree to which the user is associated with each of the entities (e.g., with each of the teams on the list). For example, the user-specific information may include information about a person's relationship to the user (e.g., the user's manager, the user's team member, the user's direct report, and the like). Moreover, the user-specific information may include the number of times and/or length of time the user has collaborated with or has been associated with each person.

In some implementations, the user-specific information is retrieved from one or more remote or local services, such as a directory service, a collaboration service, a communication service, and/or a productivity service background framework and stored in a user-specific data structure, such as the user data structure 116. Alternatively, the user-specific information may simply be retrieved from the local and/or remote services, when needed.

Once retrieved, the user-specific information may be supplied by the grouping service 114 to a search engine 160 and/or ranking engine 162 to search for and identify relevant files. The process of searching and ranking results is discussed in detail in U.S. patent application Ser. No. 16/822,877, entitled "Intelligent Ranking of Search Results," and filed on Mar. 18, 2020, the entirety of which is incorporated herein by reference.

In some implementations, to perform a search for relevant files, the grouping service 114 may first determine, based on the user-specific information in the user data structure 116 and/or other user history information, the type of files that may be relevant to the user. For example, based on the user's history, it may be determined that the user often works on files that are authored by a certain person. In another example, the grouping service 114 may determine that the user often opens files that have been recently reviewed by the user's manager. In yet another example, it may be determined that most users are interested in files that they created in the last week. In other examples, it may be determined that the user often works on files with specific subject matters (e.g., files relating to a specific project or topic) and/or specific types of files (e.g., word processing files or spreadsheets). Such information may be used to train one or more ML models that are used as part of the grouping service 114 to identify appropriate parameters for searching for relevant files or specific file types.

Once these parameters are identified (e.g., the models are trained), user-specific information (e.g., information from the user data structure 116) may be utilized along with the identified parameters (e.g., file type) to submit one or more search requests to the search engine 160. For example, a search request may be made to identify files authored or formatted by the user's manager and/or other specific team members in the last seven days. In another example, the search request may be for word processing files authored or formatted by the user's manager. The search engine 160 may then search for files in the data store 152 that meet the identified parameters. The searching may be done by examining the files' metadata (e.g., file properties) and/or file content to identify files that fall within specific lifecycle stages, for which certain user categories were identified for specific users within a given time period, include specific subject matter(s) (e.g., as identified in the metadata and/or located in the file content), and/or are specific file types.

Once searching is complete, the search engine 160 may return a search results index containing a list of search result files. For each file on the list, the search results index may indicate one or more properties for the file. These properties may include the user categories, lifecycle stages, activity levels, subject matters and/or relevant file activities performed on each file, as further discussed below. The returned search results index may include a large number of search result files that satisfy the parameters of the search request. If the grouping service 114 were to submit the list of all the search result files to the client device 120, a significant amount of memory, processing power and bandwidth may be needed. Furthermore, once the results are presented to the user, it may take the user a significant amount of time to review all the search result files to find a desired file. To mitigate this, among other benefits, the present techniques utilize the ranking engine 162 to rank the search result files based on their relevance to the user.

The ranking engine 162 may compare the user-specific information with the properties of the search result files to rank the files according to their relevance. For example, the ranking engine 162 may determine based on the properties of the search result files, that the last reader of a file is a person closely associated with the user or that a file in the search result index was shared one or more times among people associated with the user. The ranking engine 162 may then compute a relevance score for one or more of the search result files based on the comparison, among other factors, and subsequently rank the search result files based on the computed scores. In some implementations, the relevance scores may be calculated based on a relevance value for a property associated with the user and a weight of the associated property. In an example, the user-specific information identifies an individual that has a relevance value of 3.2 and is an editor of a file within the search results files, where the editor property has an associated weight of 0.5. For such an example, to calculate the relevance score, the ranking engine 116 may multiply the relevance value of the person (3.2) by the weight of the associated file property (0.5) to arrive at a value of 1.6. The value of 1.6 may be one of many values included in the computation of the relevance score for the file. Once the relevance score is computed, the file may be ranked relative to other files, based on the calculated relevance score. Depending on the number of files in the search results index, a portion of (or a specific number of) the search results files having the highest scores may be provided to the grouping engine 164. In one implementation, the relevance scores may also be used by the grouping engine 164 in organizing and prioritizing the files presented to the user, with the files having higher relevance scores being displayed higher in the list. Thus, the ranking engine 162 may receive the search results index as an input and may provide the ranked search result files to the grouping engine 164 for further use.

In an alternative implementation, instead of utilizing the search engine 160, the grouping service 114 may utilize the user-specific information contained in the user data structure 116 to identify relevant files. This may be achieved, for example, when the user data structure 116 contains information about the files recently accessed by the user and the activities performed by the user on each of those files (e.g., the user category property for one or more files). This file information may be available for each user. As a result, once users that are closely associated with the user are identified, their associated user data structures may be accessed to identify files that were recently accessed by them and the types of activities performed on those files. The files on those lists may then be aggregated, evaluated and ranked, for example by the ranking engine 162, to identify the more relevant files.

Once relevant files have been identified and a ranked list has been transmitted to the grouping engine 164, the grouping engine 164 may organize the relevant files in a manner that is consistent with the needs or preferences of the user. In one implementation, this may involve organizing the files into one or more groups based on the user category identified for the file (e.g., based on the types of actions performed on the file), the date and/or time associated with the identified user category, and/or the user who performed the associated actions. This information may be retrieved from the properties (e.g., metadata) associated with each file and used an input to the grouping engine 164 for organizing the files into one or more groups. In some implementations, the grouping engine 164 may utilize one or more ML models to determine how to organize the files. For example, the ML models may determine (e.g., based on user feedback data) that files authored or reviewed in the last week by the user's team members are more likely to be relevant to the user. As a result, the ML models may identify such files from amongst the list of relevant files and display those files in a more prominent space within the file groupings. Data relating to the organized file groups may be transmitted by the grouping engine 164 to the applications 112 for display to the user.

Figure 1C:
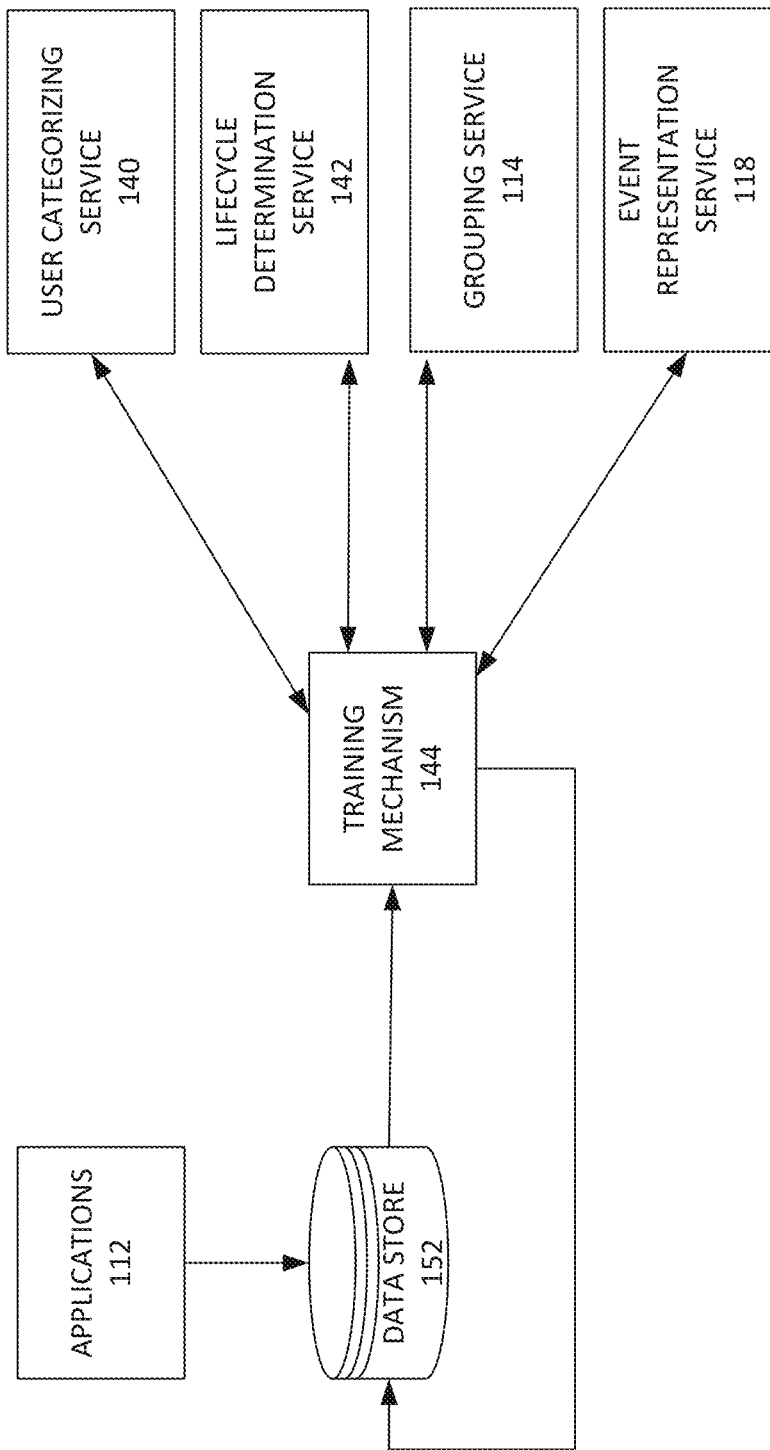

In addition to displaying relevant file groups to the user, the system 100 of FIGS. 1A-1C may also include an event representation service 118 configured to provide an event representation for each file. In some implementations, the event representation service 118 may retrieve the user category, relevant file activities, lifecycle stage, and/or activity level of a specific file from the data store 152 and/or from the applications 112 and provide an event representation for the file based on those properties.

The event representations may be user-centric and/or file-centric. A user-centric event representation may depict the user's relationship with the file over a length of time, while a file-centric event representation may depict a history of all users' activities with respect to the file. To provide these event representations, the event representation service 118 may include a user-centric engine 170 and a file-centric engine 172.

Once a request to provide a user-centric event representation for a file is received from the application(s) 112, the user-centric engine 170 may retrieve user-specific information from the user data structure 116 and/or the application(s) 112. The user-specific information may include a user ID that can be used to determine which user categories are associated with the identified user. Property information relating to the file may then be retrieved from the data store 152 (or other storage medium). The user-centric engine 170 may then identify which of the relevant file activities performed on the file and/or user categories stored for the file are associated with the user. When a large number of such activities are identified, one or more ML models may be utilized to evaluate the activities and determine which of the identified activities are more relevant and as such should be included in the event representation. That is, to avoid information overload, only a subset of activities may be presented in the event representation. Determining which activities to include in the event representation may involve identifying which types of activities are more significant to the history of the file. Such determination may be user-specific (e.g., using a personal ML model) and/or based on global user data (e.g., using a global ML model). For example, it may be determined based on global user data that activities relating to creation, authoring and finalizing a file are relevant file activities for an event representation. In another example, it may be determined based on user-specific information that reviewing the file is a relevant activity for the specific user (e.g., the user is a reviewer). Such information may be used to determined which relevant file activities and which user categories to use for generating the event representation. In some implementations, in determining which relevant file activities to use for generating the event representation, the activity level property of the file is also evaluated. The activity level may be used to determine at which times there was more activity performed on the file. More active time periods may be associated with important lifecycle stages for the file, which may in turn be associated with more relevant file activities and/or user categories.

Once relevant file activities and/or user categories are identified, information relating to those relevant file activities and/or user categories may be retrieved from the file properties. The user-centric engine 170 may then generate file event data based on the retrieved user activities and/or user categories. This may be done by first generating a file event for one or more of the relevant file activities and/or user categories (e.g., a file event for each relevant activity and/or user category) and then using the retrieved information to generate file event data for each generated file event. The file event data may refer to data that identifies a file event and provides information about the file event. For example, if the file event is creating the file, the file event data may include the date/time at which the file was created and/or the name of the user who created the file. The generated file event data may then be organized chronologically and/or based on relevance. In some implementations, the file event data may be organized based on time. In other implementations, the file event data may be organized by ordering the file events based on their relevance (e.g., their importance to the file and/or user). This ordered file event data may be provided by the user-centric engine 170 to the applications 112 for display on a user-centric event representation. The information provided may include the time and/or date of each activity and/or user category and the type of activity and/or user category.

In addition to providing a user-centric event representation, the event representation service 118 may provide a file-centric event representation by utilizing the file-centric engine 172. The process of providing a file-centric event representation may begin upon receiving a request from the application(s) 112 to provide a file-centric event representation for a file. Once a request is received, the file-centric engine 170 may retrieve user-specific information from the user data structure 116 and/or the application(s) 112. The user-specific information may include information about the user and other persons associated with the user. Property information relating to the file may then be retrieved from the data store 152 (or other storage medium). The file-centric engine 170 may then evaluate the user category, lifecycle stage, subject matter and/or relevant activity data associated with the file to determine which of the relevant file activities performed on the file and/or user categories stored for the file should be included in the event representation. This may be achieved by utilizing one or more ML models, as discussed herein and may include examining the persons who performed the relevant file activities and/or are associated with the user categories.

Once relevant activities and/or user categories are identified, the file-centric engine 172 may retrieve the relevant activities and/or user categories. The file-centric engine 172 may then generate file event data based on the retrieved relevant file activities and/or user categories. The generated file event data may be organized chronologically and/or based on relevance. This ordered file event data may then be provided by the file-centric engine 172 to the application(s) 112 for display on the file-centric event representation. The information provided may include time and/or date of each activity and/or user category, the type of activity and/or user category, and the user who performed the activity or is associated with the user category.

The local user categorizing engine 124, lifecycle determination engine 128, grouping engine 132 and/or event representation engine 134 of the client device 120 (in FIG. 1A) may include similar elements and may function similarly to the user categorizing service 140, lifecycle determination service 142, grouping service 114 and/or event representation service 118 (as depicted in FIG. 1B).

FIG. 1C depicts how one or more ML models used by the user categorizing service 140, lifecycle determination service 142, grouping service 114 and/or event representation service 118 may be trained by using the training mechanism 144. The training mechanism 144 may use training data sets stored in the data store 152 to provide initial and ongoing training for each of the models included in the user categorizing service 140, lifecycle determination service 142, grouping service 114 and/or event representation service 118. For example, each of the search engine 160, ranking engine 162, grouping engine 164, user centric engine 170 and file centric engine 172 may be trained by the training mechanism 144 using corresponding data sets from the data store 152. To provide ongoing training, the training mechanism 144 may also use training data sets received from each of the ML models. Furthermore, data may be provided from the training mechanism 144 to the data store 152 to update one or more of the training data sets in order to provide updated and ongoing training. Additionally, the training mechanism 144 may receive training data such as knowledge from public repositories (e.g., Internet), knowledge from other enterprise sources, or knowledge from other pre-trained mechanisms.

FIG. 2 depicts an example data structure 200, such as a database table, for keeping track of user activity within a session. For example, data structure 200 may include a session start time 210 and a session end time 240. The session start time 210 may be marked as the time the user opens a file and/or the time the user returns to an open file after an idle period. The session end time 240, on the other hand, may be marked as the time the file is closed or the time the last user activity occurs before the file becomes idle. In between the session start time 210 and the session end time 240, the data structure 200 may be used to keep track of user activities by recording activity identifiers 230 (e.g., TCIDs) associated with each separate user activity. Furthermore, in order to identify the user who performs the activities, the data structure 200 may store the user ID 220 of the person interacting with the file.

In some implementations, in addition to storing the user activity identifier 230, information about the activities performed may be stored. This may be done for specific predetermined activities. For example, authoring (e.g., writing one or more sentences in a word document) may be identified as a predetermined activity. In some cases, one or more ML models may be used to determine the subject matter of the content authored by the user. This may be achieved by utilizing natural-language processing algorithms, among others. The subject matter may then be stored in the subject matter field 235 in the data structure 200. For example, when user activity identifier 30010 is determined to relate to authoring a paragraph, the application may utilize one or more ML models to identify the subject matter of the new paragraph to include in the subject matter field 235. This information may be transmitted as part of the usage signal and stored with the file as a property for future use in determining relevance.

Once a determination is made that a session end time has been reached, the information collected during the session may be transmitted as part of the usage signal to the user categorizing service and/or the lifecycle determination service for use in identifying one or more user categories for the corresponding session, one or more relevant file activities performed on the file, a lifecycle stage for the file and/or the level of activity for the file. The usage signal may be a high-fidelity signal which includes detailed information about the types of activities performed on the file within a given time period.

After the usage signal has been used to generate a user category signal, the user category signal may be transmitted back to the application and/or to the storage medium storing the file. In one implementation, the user category signal may include the identified user category, the file ID, user ID, session date and time, and/or session length. In some implementations, the user category may also include the subject matter(s) identified and stored in the usage signal.

The user category provided as part of the user category signal may be the category identified as being associated with the user's activity. In some implementations, categories may include one or more of creator, author, reviewer, moderator, and reader. The file ID may be a file identifier that can identify the file with which the user activity is associated. This may enable the user category signal to be attached to the file. In one implementation, the user category signal is stored as metadata for the file. The user ID may identify the user who performed the user activities during the session. This may enable the system to properly attribute the identified category of activities to the identified user. The session length may be the length of the active session and may be stored and used as a property related to file relevance.

The user category signal, activity level, lifecycle stage, subject matter of all or a portion of the file and/or relevant file activities that are identified in the session may be transmitted to the storage medium to be stored, e.g., in a graph for future use. In an example, new properties for the file may be stored (e.g., in a folder associated with the file or the signals folder) based on the user category signal, activity level, lifecycle stage, relevant file activities and/or subject matters. The properties may be configured for propagation to secondary files, in whole or in part. In this manner, a copy made of the file may inherit some or all of the properties of the original file.

FIGS. 3A-3B depict example properties associated with a file that may be used to provide intelligent file identification, grouping and/or event representation. FIG. 3A illustrates a data structure 300A, such as a database table, containing information that may be related to a file's relevance and/or may be used to create an event representation. Data structure 300A may include a file name 310, a level of activity 320 and a lifecycle stage 330. The file name 310 may be the file name utilized to store the file. Alternatively, the file name may be a file ID (e.g., a file identifier that is different than the file name) used to identify the file. In one implementation, the file name includes information about the location at which the file is stored. Alternatively or additionally, the properties retrieved may include a link to the storage location at which the file is stored.

The level of activity 320 may contain an indication of one or more activity levels identified over time for the file. The activity levels may provide a history of how active the file has been and may be associated with a weight (not shown) for calculating the relevance score for the file. For example, activity levels may include non-active, low activity, active, very active, or extremely active. In some implementations, the activity level field 320 may include one activity level for the file based on the number of activities performed recently or based on all activities performed overtime on the file. For example, the activity level field 320 may only include an indication that the file is a very active file based on all file activities performed in the last month. The lifecycle stage 330 may contain a list of identified lifecycle stages of the file. The lifecycle stages may provide additional information for determining file relevance and may be used in generating the event representation.

The data structure 300A may also include user categories 340 that have been identified for the file along with information relating to the user associated with each user category. For example, the user categories 340 may include the categories that have been identified for the file since its creation or for a particular time period and may include a user ID associated with each identified category. In one implementation, user categories from a predetermined time period (e.g., the last seven days) may be used in determining file relevance. To allow for selecting the user categories based on their recency, the data structure 300A may also include the session date and/or time 350 for each identified user category.

The data structure 300A may also include a session duration 360, which may indicate a session length for each session, when applicable. The session duration 360 may only apply to activities for which the amount of time spent on the activity relates to the importance of the file. For example, the amount of time creating a file (e.g., creating a blank file and storing it) may not be relevant and as such may not be stored and/or retrieved. The session duration, when provided, may directly relate to the utility of the file. As such, the session duration may have a weight associated with it for determining file relevance and/or the user category.

FIG. 3B illustrates a data structure 300B, such as a database table, for storing an indication of one or more relevant activities for a given file. Data structure 300B may include a file name 310, relevant file activities 370, activity times 380 associated with each relevant file activity 370 and user IDs 390 associated with each relevant file activity 370. As discussed with respect to FIG. 3A, the file name 310 may be the file name utilized to store the file or a file ID used to identify the file. The relevant file activities 370 may include one or more activities performed on the file that may signify the file's relevance. As discussed above, the types of activities in various applications that relate to relevance of a file may be predetermined. Once information about activities performed with respect to a file is received (e.g., via the usage signal), relevant file activities are identified by comparing the list of activities performed in the file with the predetermined types of activities identified as being relevant. These activities may then be stored as properties of the file and may be retrieved and/or accessed when needed (e.g., when performing search results ranking).

Each relevant activity 370 may be associated with a weight (not shown). The weight may be predetermined for each activity and may relate to the likelihood of the activity indicating that the file is relevant. The activity time 380 may also be associated with a weight (not shown) for calculating the relevance score of the file. Alternatively or additionally, the weight of a relevant activity may be multiplied by the relevance value of the user 390 performing the activity and the resulting number may be used as one of the factors in calculating the final relevance score of the file.

A relevant activity, such as those illustrated in the relevant activity field 370, may be used in ranking the file at multiple different levels, each of which may correspond to different weights. These levels include personal, collaborative and/or global. At the personal level, the relevant activity may indicate that the user has performed the relevant activity. At the collaborative level, the relevant activity may have been performed by people associated with the user (e.g., one or more people the user works with have printed the file). At the global level, the relevant activity may indicate that a large number of people (regardless of whether they are associated with the user or not) may have performed the relevant activity.

In one implementation, each property having a weight may be multiplied by a relevance value and the relevance score may be calculated as a weighted sum of the relevance values. For example, for a file having a high level of activity, a user category of reader with a recent and long session duration and a recent relevant activity, the relevance score may be calculated by multiplying the relevance value associated with the user with the weight associated with the high level of activity, the weight associated with the reader category, the weight associated with a long session, the weight associated with a recent session, and the weight associated the recent relevant activity. The relevance score may then be calculated by adding the weighted relevance values together to arrive at the final score. Many other factors may also be used in calculating the relevance score.

Once the relevance scores are calculated for one or more files in the search results index, those files identified as meeting a search ranking threshold requirement and/or having higher relevance scores may be provided to the grouping engine for grouping. FIGS. 4A-4B depict example GUI screens for displaying groups of relevant files to a user. The GUI screen 400A of FIG. 4A represents one or more UI elements for displaying groups of relevant files organized based on activities performed on the files by persons who are associated with the user. As illustrated, the files may be organized by user category, person associated with the user category and/or that person's relationship with the user. For example, a grouping may be identified based on the relationship between the user and the person who performed certain types of action in the files. As depicted in FIG. 4A, this may include the user's manager, the user's colleagues, the user's team, and the user's direct reports. To add another level of granularity, the files may be organized based on the types of actions taken by each of these people (e.g., finalized, formatted, created, reviewed, and the like).

In alternative implementations, the time and/or date of the performed actions may also be used in organizing the files. For example, separate groups may be provided for files that were finalized in the last week and for files that were finalized in the last month. In some implementations, the UI elements may include one or more options for the user to select a desired time period for which files should be displayed (e.g., files on which an action was performed in the last seven days). In another example, the UI element may also provide an option for selecting the persons whose activities on files may be considered. For example, if a user is not interested in actions performed by his direct reports, the user may utilize a UI menu option to indicate such desire.

Thus, the resulting groupings can provide a list of files that are likely to be of high relevance to the user and which are organized based on their relevance and/or their relationship to the user.

While GUI screen 400A depicts a list of files that have been recently accessed/modified by a group of people, a similar GUI screen may be used to depict files that have been recently accessed and/or modified by the user. GUI screen 400B of FIG. 4B depicts such an example. As depicted, the files may be organized based on their lifecycle stage and/or the latest actions performed by the user. For example, files that were recently finalized and shared by the user may be organized in the same group, while files the user recently reviewed may be displayed in a different group. As discussed above, a time element may also be used to further organize the files. For example, the groups may be further divided into files finalized and shared in the last week and files finalized and shared in the last month. In one implementation, a menu option may be provided to allow the user to switch between different time periods in order to provide further organization.

UI elements such as the ones displayed in GUI screens 400A and 400B may be displayed as part of a variety of applications. For example, such screens may be displayed when the user first launches a file management system. In another example, the UI elements may be displayed as part of a collaborative work environment application. In some implementations, the UI elements may be provided on a home page of an enterprise application. For example, when the user first logs into an enterprise computing device, the UI elements may be displayed to enable the user to quickly identify relevant files of interest and determine the latest developments that may have occurred to the files.

In this manner, the techniques may provide a significant advantage over currently used mechanisms of providing information about files. Currently, applications that provide a list of files for the user often simply provide a list of files that were recently opened and/or saved by the viewer without taking into account the types of actions that have been performed on the files and the files' relationship with the user. By organizing the files based on their relationship with the user and based on the user's relationships with other persons, the user can easily and quickly determine the status of relevant files. This may assist the user in determining status of projects and identifying tasks that may require the user's attention. Moreover, it may notify the user of the latest changes to relevant files, assisting the user in staying up to date on relevant work. Furthermore, the organized groupings may help the user quickly access the relevant files (e.g., by directly selecting a file in the displayed GUI) instead of having to locate each file in a storage system. This not only increases user efficiency, but may also increase system and bandwidth efficiency as it reduces the need for accessing different file management systems and data stores to retrieve a relevant file and/or multiple attempts (e.g., unsuccessful searches) for locating the relevant file.

Figure 5A:
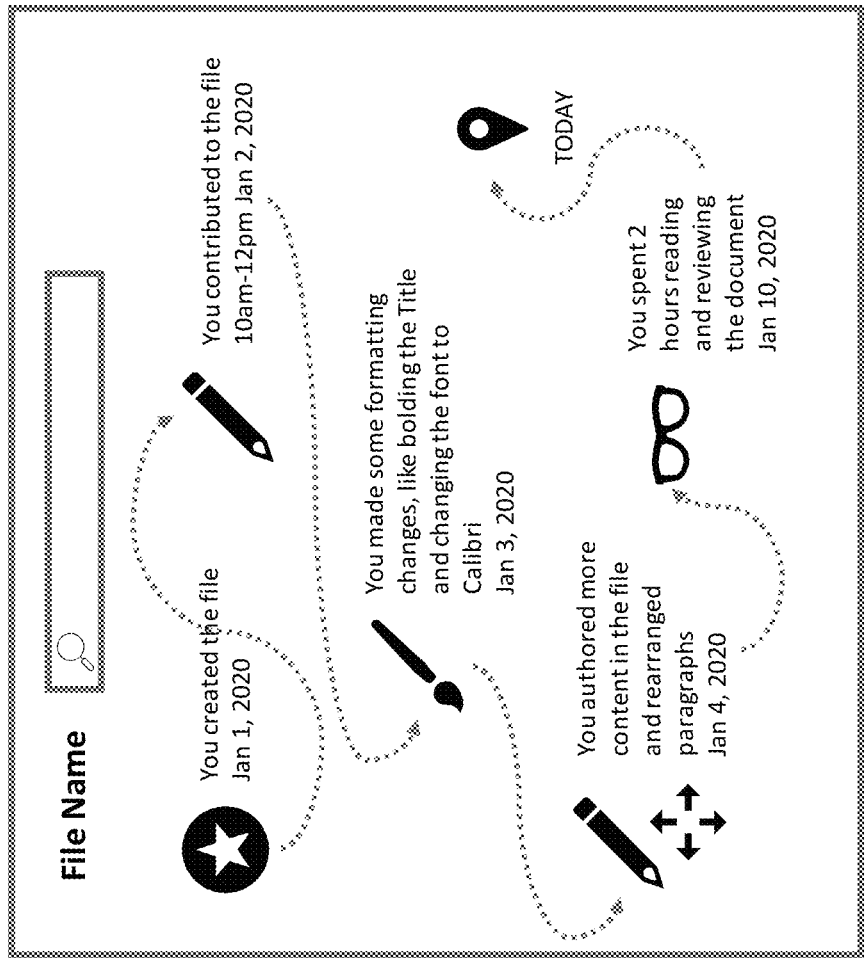
FIGS. 5A-5B are example GUI screens for displaying event representations for a file.
Figure 5B:
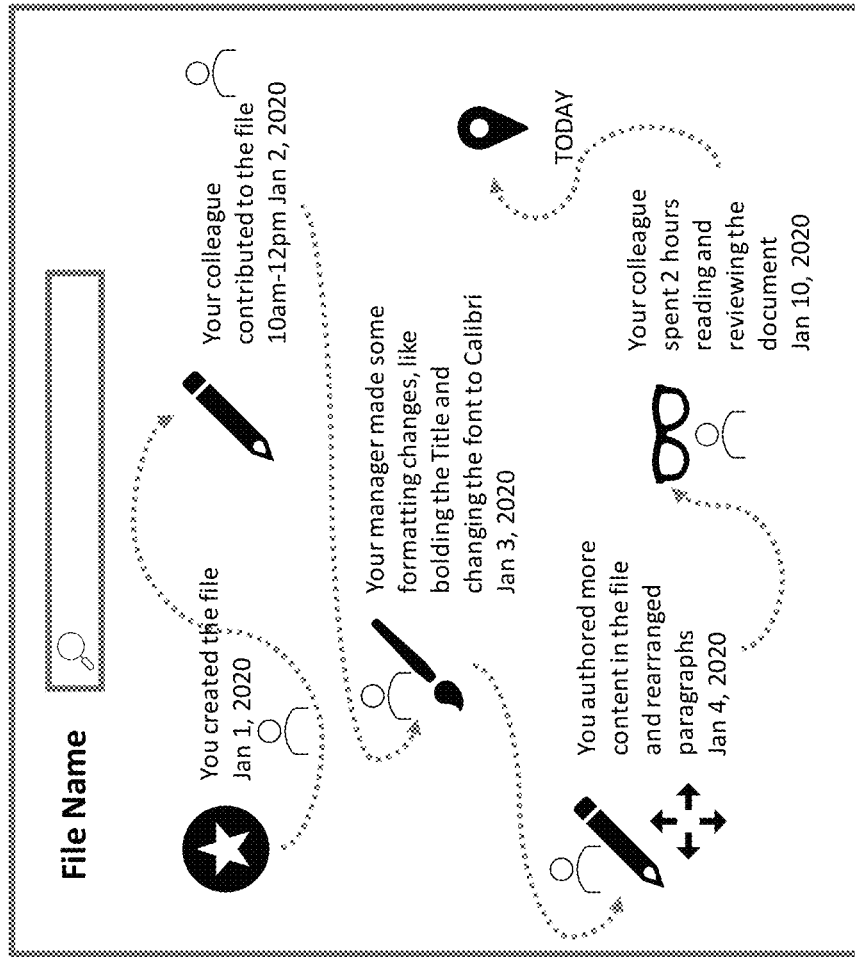

FIGS. 5A-5B are example GUI screens for displaying event representations for a file. The GUI screen 500A of FIG. 5A represents UI elements for displaying a user-centric event representation. As depicted, the user-centric map may display a timeline of actions performed on the file by the user throughout the history of the file. As discussed above, in some implementations, the actions performed are evaluated such that relevant actions are displayed on the event representation. Each event displayed on the event representation may be accompanied by a textual description. The textual description may provide information as to how the file event relates to the user. For example, the first file event may state "you created the file Jan. 1, 2020." This statement not only identifies the action and the person who performed it, but also how the person is related to the user. In this case, since the person who performed the action is the same as the user, the term "you" is utilized. However, in file-centric event representations, such as the event representation of GUI screen 500B depicted in FIG. 5B, terms such as "your colleague" or "your manager" may be used to signify the person's relationship with the user. In an alternative implementation, the person's name may be used.

In some implementations, the textual description for file events provided on the event representation includes specific information about the actions performed. For example, the textual description may state "you made some formatting changes, like bolding the title and changing the font" or "you rearranged paragraphs." In another example, the textual description may specify the amount of time (e.g., session duration) spent on performing an action. This information may be provided by examining data contained in the usage signals. The textual description may also include information about the subject matter of the content on which activities were performed. For example, the textual description may state "you authored two paragraphs related to quality control." In some implementations, the textual description is generated by utilizing one or more templates. Additionally and/or alternatively, one or more ML models may be utilized to determine how to generate the textual descriptions based on factors such as the type of file event, the type of relevant file activity, and/or the type of user category.

The user-centric and/or file-centric event representations may be provided based on user request. For example, content creation applications and/or file management applications may provide an option for viewing a user-centric and/or file-centric event representation for a given file. In one implementation, options for displaying the event representations are provided in a backstage view of the file. In other implementations, options for displaying event representations may be provided anywhere a file is listed (e.g., in a search results list or in a file folder).

The event representations may provide a quick glance at the history of the file as it relates to the user, thus enabling the user to quickly and efficiently examine the history and/or status of the file. This may provide a level of information about files that has not been previously available to users. Furthermore, the information may be provided in a user-friendly and convenient manner on one page for easy review and understanding.

Figure 6:
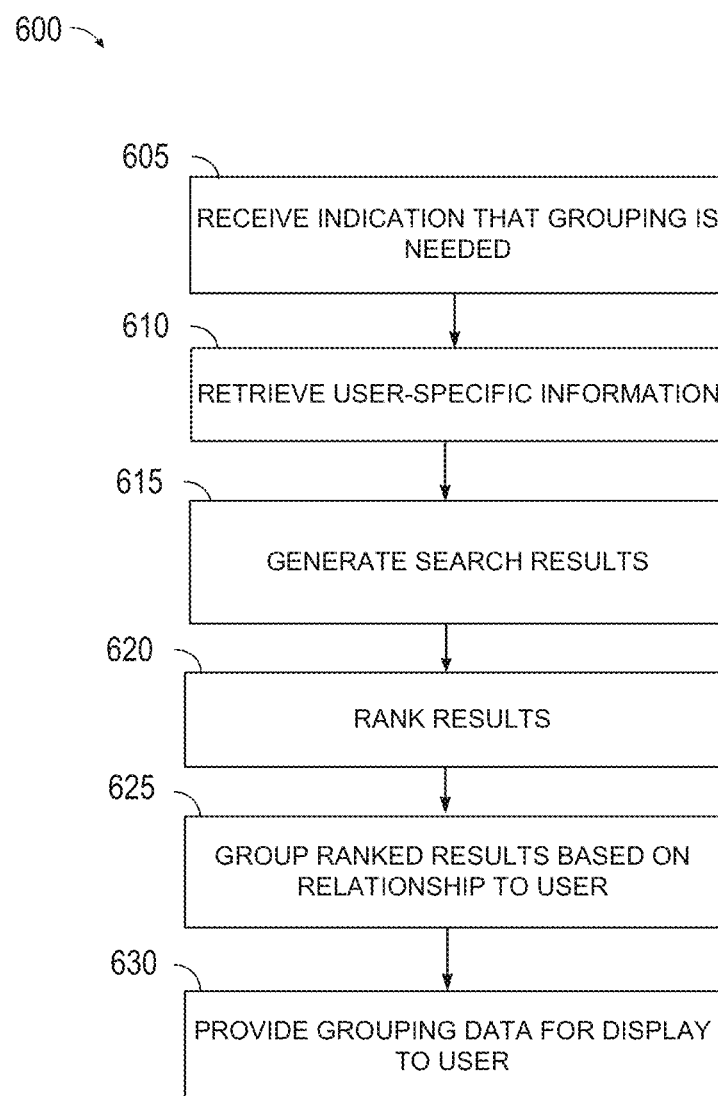
FIG. 6 is a flow diagram depicting an exemplary method for intelligently identifying and grouping relevant files associated with a user.

FIG. 6 is a flow diagram depicting an exemplary method 600 for intelligently identifying and grouping relevant files. The method 600 may be performed by a grouping service or grouping engine such as the grouping service 114 and grouping engine 132 of FIGS. 1A-1C. At 605, method 600 may begin by receiving an indication to display a group of relevant files for a user. The request may be received from an application upon the application's launch or based on user request. For example, the user may utilize a UI element provided by the application to request that a list of relevant files be displayed. The application may then transmit the request to the local or global grouping service.

Upon receiving the indication, the grouping service may retrieve user-specific information, at 610, for use in identifying relevant files. As discussed above, the retrieved user-specific information may include data relating to persons, groups or teams the user may be associated with and the user's relationship to each of those entities. This user-specific information may be then be used, along with other parameters, to generate search results, at 615. Generating search results may involve performing a search for relevant files or sending a request to an external search engine for performing the search. As discussed above, to perform a search for relevant files, the grouping service may first determine, based on data in the retrieved user-specific information and/or other user history information, the appropriate parameters that should be used for searching for relevant files. For example, it may be determined that relevant files are often limited to those accessed within the last month. As a result, recency of access may be used as a parameter in searching for relevant files.

After generating the search results, the search results may be ranked based on their relevance to the user, at 620. Ranking may be achieved by comparing the user-specific information with the properties of the files in the received search results. This may include computing a relevance score for one or more files in the search results based on the comparison, among other factors. The search results may then be ranked based on the computed relevance scores. Depending on the number of files in the search results, a portion of (or a specific number of) the files in the search results (e.g., those having higher scores) may be provided as the ranked results.

The ranked results may be provided as an input to a grouping engine which may group the ranked results based on their relationship to the user or other factors, at 630. This may be achieved by organizing the files into one or more groups based on parameters such as the person who recently accessed and/or modified the files, that person's relationship to the user, the types of actions performed on the file, and/or the recency of the actions. The resulting organization may provide a list of files that fall into each group. This information may be provided as grouping data for display to the user, at 635. The grouping data may include the list of files in each group along with information about each group such as the type of activity performed on the files, the person who performed that and the time/date the activity was performed. In this manner, the grouping data may be used by an application to display a list of one or more groups of relevant files to the user.

Figure 7:
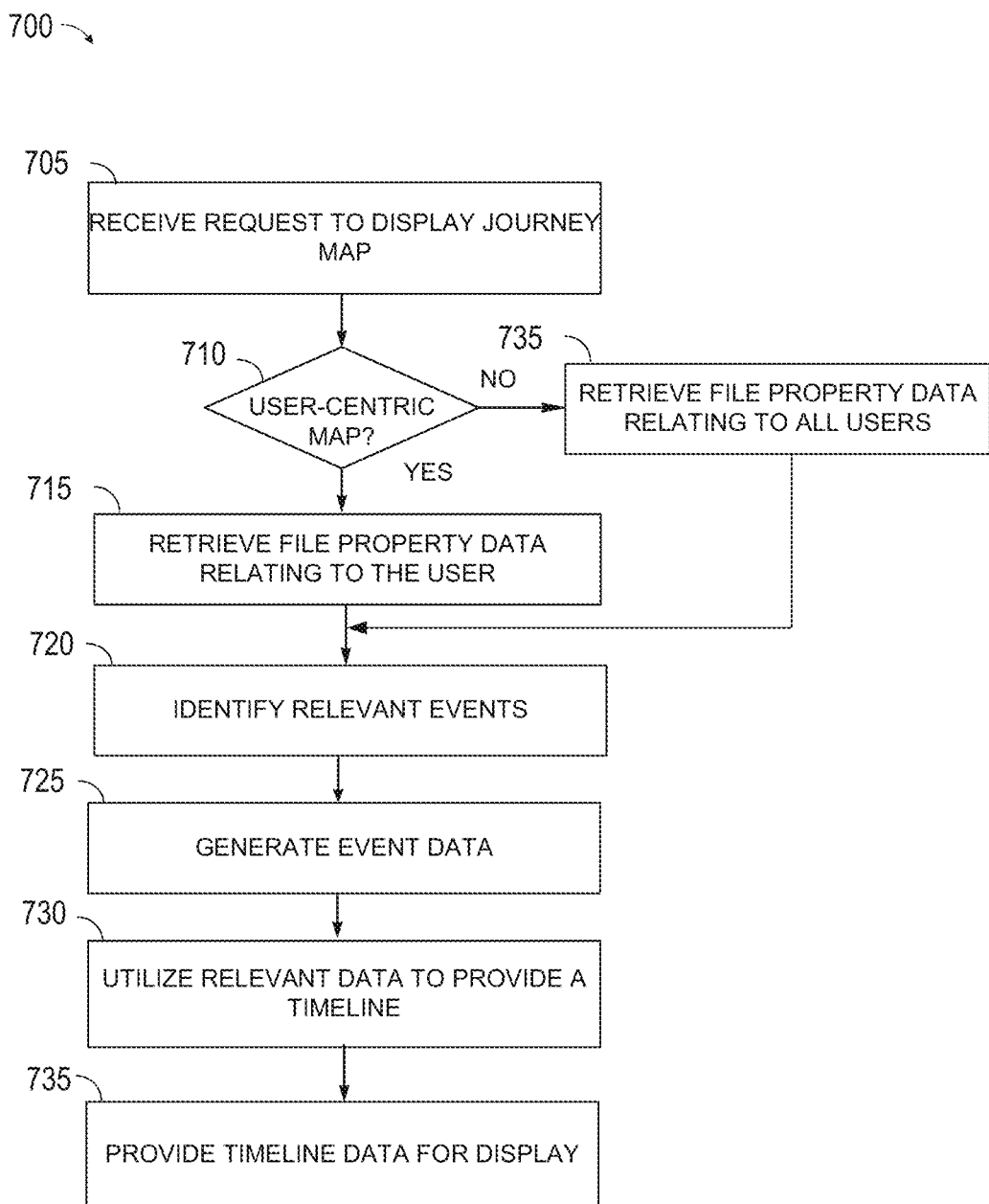
FIG. 7 is a flow diagram depicting an exemplary method for providing a journey map for a file.

FIG. 7 is a flow diagram depicting an exemplary method 700 for providing an event representation for a file. The method 700 may be performed by an event representation service or event representation engine such as the event representation service 118 and event representation engine 134 of FIGS. 1A-1C. At 705, method 700 may begin by receiving a request to display an event representation for a file. This may occur, for example, when a UI element in an application is utilized by the user to request display of an event representation for the file. The application may then transmit the request to the local or global event representation service.

Upon receiving the request, method 700 may proceed to determine whether the request is for a user-centric event representation, at 710. When it is determined that the request is for a user-centric event representation, method 700 may proceed to retrieve file property data relating to the user from the file's metadata, at 715. This information may be stored in a data structure such as the data structures 300A and 300B of FIGS. 3A-3B and in a graph, as described above. In some implementations, for a user-centric event representation, method 700 parses through the data structure to retrieve the data points that relate to the requesting user. Alternatively, all data points may be retrieved, and relevant data may be identified by method 700.

If it is determined, at 710, that the request is for a file-centric event representation, method 700 may proceed to step 735 to retrieve data relating to all users. Once the required data (e.g., user-specific or all users) is retrieved in either step 715 or 735, method 700 may proceed to identify relevant events from the retrieved data, at 720. This may involve evaluating the retrieved data to determine which of the activities included in the data may be relevant to an event representation. Once activities that are relevant to the event representation are identified, method 700 may proceed to utilize the data to generate file event data for each of those activities, at 725. In some implementations, the process may include identifying the type of information that should be included for each file event. For example, method 700 may identify the relationship between the person who performed the action and the requesting user, the relationship between the time a type of action was performed and the current time (e.g., a week ago), and the amount of details about the action that should be included in the timeline. After file event data is generated, the file event data may be used to provide an event representation of the activities, at 730. This may involve using the file event data to organize the events in an order (e.g., chronologically in a timeline). Once the timeline has been generated, method 700 may proceed to provide the timeline information to be used for display on an event representation.

Figure 8:
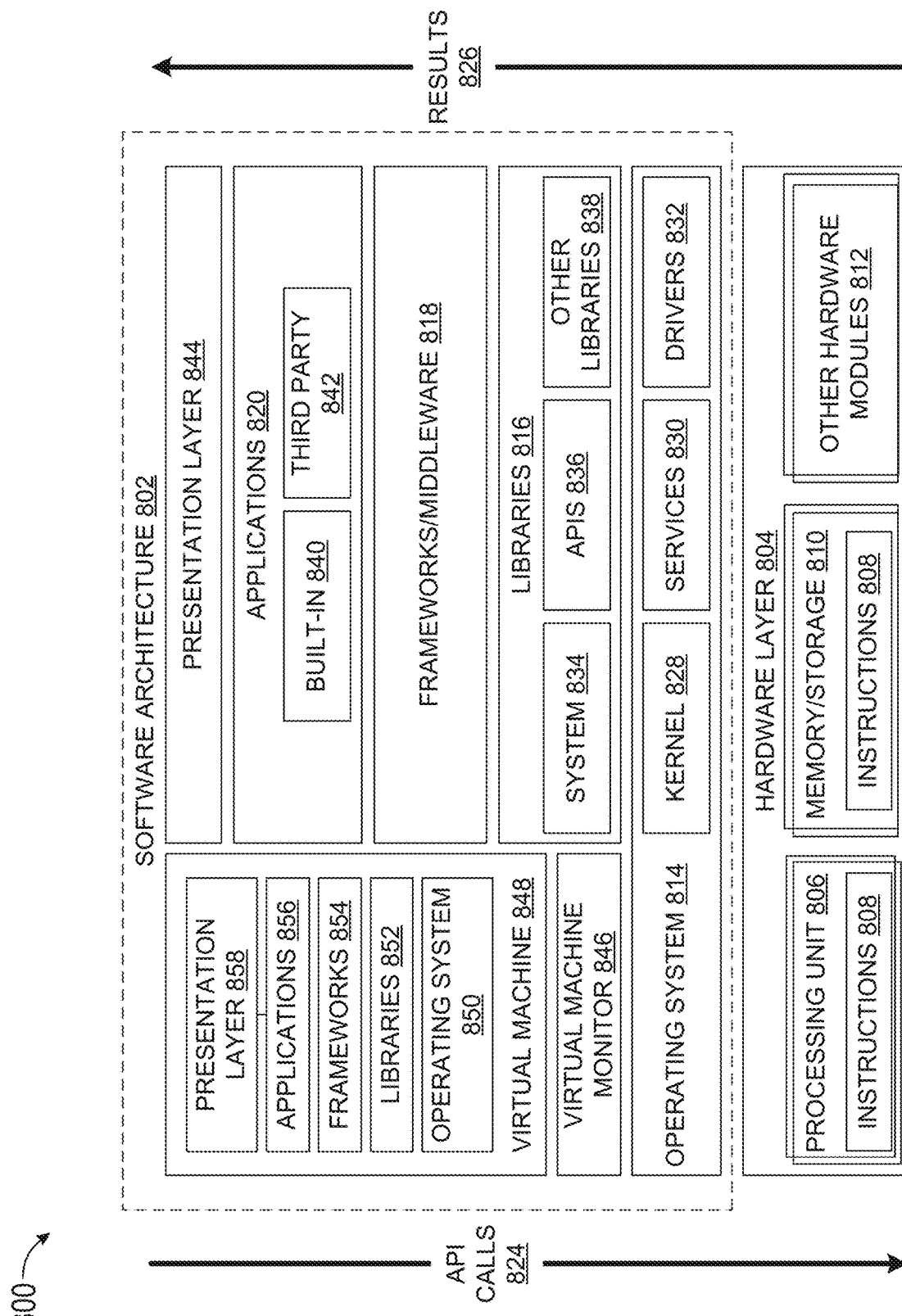
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as client devices, native application provider, web servers, server clusters, external services, and other servers. A representative hardware layer 804 includes a processing unit 806 and associated executable instructions 808. The executable instructions 808 represent executable instructions of the software architecture 802, including implementation of the methods, modules and so forth described herein.

The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 824. Operationally, the applications 620 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various GUI functions, high-level resource management, or high-level location services. The frameworks 818 may provide a broad spectrum of other APIs for applications 820 and/or other software modules.

The applications 820 include built-in applications 820 and/or third-party applications 822. Examples of built-in applications 820 may include, but are not limited to, a contacts application, a browser application, a location application, a media application, a messaging application, and/or a game application. Third-party applications 822 may include any applications developed by an entity other than the vendor of the particular system. The applications 820 may use functions available via OS 814, libraries 816, frameworks 818, and presentation layer 824 to create user interfaces to interact with users.

Some software architectures use virtual machines, as illustrated by a virtual machine 828. The virtual machine 828 provides an execution environment where applications/modules can execute as if they were executing on a hardware machine (such as the machine 800 of FIG. 8, for example). The virtual machine 828 may be hosted by a host OS (for example, OS 814) or hypervisor, and may have a virtual machine monitor 826 which manages operation of the virtual machine 828 and interoperation with the host operating system. A software architecture, which may be different from software architecture 802 outside of the virtual machine, executes within the virtual machine 828 such as an OS 850, libraries 852, frameworks 854, applications 856, and/or a presentation layer 858.

Figure 9:
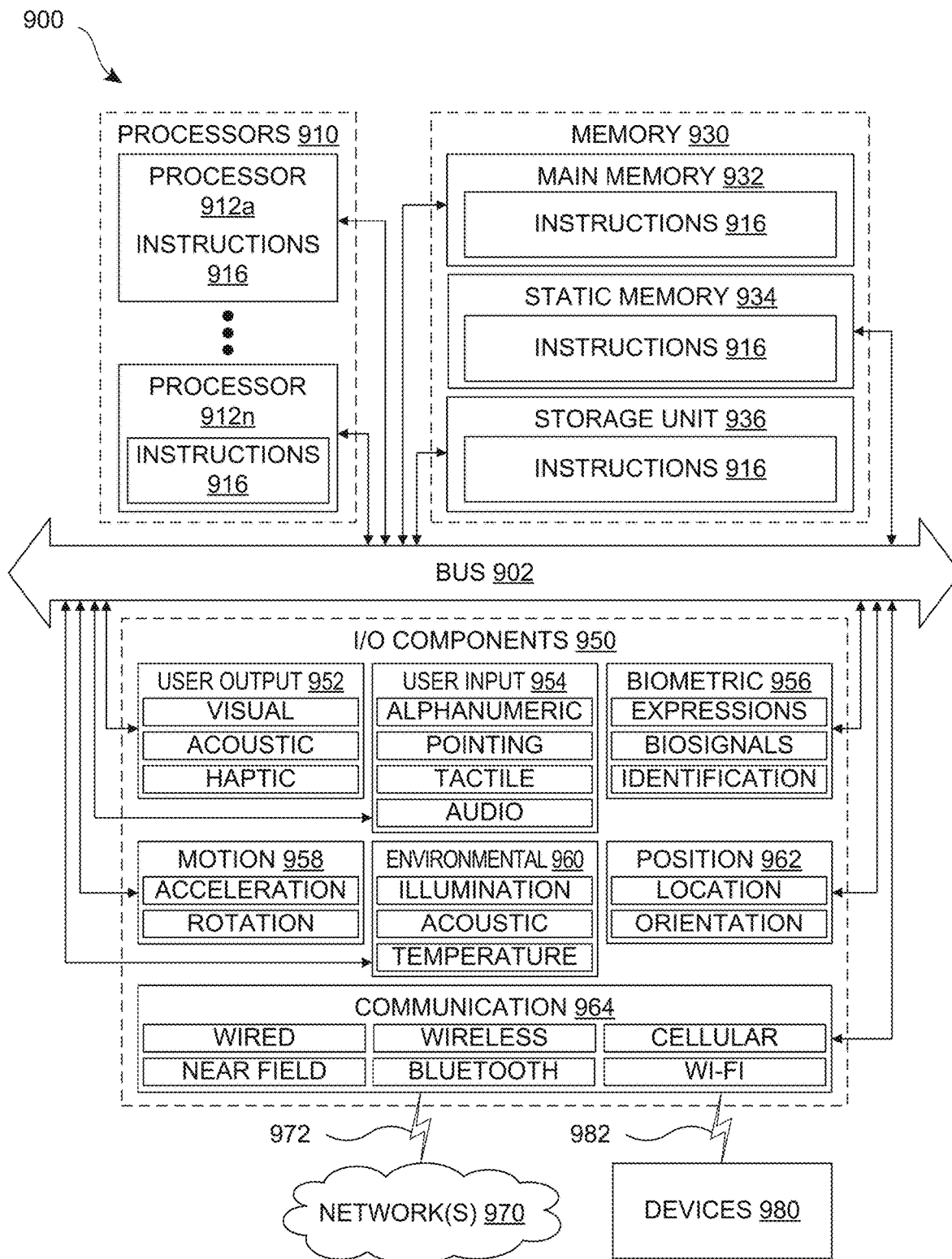
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement methods or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 716.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "computer-readable medium" refers to a device able to temporarily or permanently store instructions and data that cause machine 900 to operate in a specific fashion. The term "computer-readable medium," as used herein, may include both communication media (e.g., transitory electrical or electromagnetic signals such as a carrier wave propagating through a medium) and storage media (i.e., tangible and/or non-transitory media). Non-limiting examples of a computer readable storage media may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable storage media" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "computer-readable storage media" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by, the processor, cause the data processing system to perform functions of:
  retrieving a user data signal including user-specific data for identifying one or more groups of relevant files;
  analyzing the user data signal to identify a parameter relating to file relevance;
  identifying one or more relevant files in a storage medium based on the parameter and at least one of a user category property, a lifecycle stage property, a relevant activity property, or an activity level property of one or more files in the storage medium;
  organizing the one or more relevant files into the one or more groups; and
  providing for display data relating to the one or more groups.

Item 2. The data processing system of item 1, wherein the user-specific data includes at least one of one or more persons, one or more groups, and one or more entities associated with the user.

Item 3. The data processing system of item 1 or 2, wherein the user-specific data further includes a relationship between the one or more persons, the one or more groups and the one or more entities and the user.

Item 4. The data processing system of any one of the preceding items, wherein the one or more parameters relating to file relevance include at least one of the one or more persons, the one or more groups, the one or more entities, or the relationship between the one or more persons, the one or more groups, or the one or more entities and the user.

Item 5. The data processing system of any one of the preceding items, wherein the memory further includes executable instructions that, when executed by, the processor, cause the processor to perform a function of ranking the one or more relevant files based on their relevance to the user.

Item 6. The data processing system of any one of the preceding items, wherein the memory further includes executable instructions that, when executed by, the processor, cause the processor to identify the one or more groups of relevant files based on at least one of the user category property and a person who performed an action associated with the user category property.

Item 7. The data processing system of any one of the preceding items, wherein the parameter relating to the file relevance includes a recency of activity performed on the one or more relevant files.

Item 8. A method for intelligently organizing one or more groups of relevant files comprising:
  retrieving a user data signal including user-specific data;
  analyzing the user data signal to identify a parameter relating to file relevance;
  identifying one or more relevant files in a storage medium based on the parameter and at least one of a user category property, a lifecycle stage property, a relevant activity property, or an activity level property of one or more files in the storage medium;
  organizing the one or more relevant files into the one or more groups; and
  providing for display data relating to the one or more groups.

Item 9. The method of item 8, wherein the user-specific data includes at least one of one or more persons, one or more groups, and one or more entities associated with the user.

Item 10. The method of items 8 or 9, wherein the user-specific data further includes a relationship between the one or more persons, the one or more groups and the one or more entities and the user.

Item 11. The method of any one of items 8-10, wherein the one or more parameters relating to file relevance include at least one of the one or more persons, the one or more groups, the one or more entities, or the relationship between the one or more persons, the one or more groups or the one or more entities and the user.

Item 12. The method of any one of items 8-11, wherein the parameter relating to file relevance includes a recency of activity performed one the one or more relevant files.

Item 13. The method of any one of items 8-12, wherein organizing the one or more relevant files into the one or more groups of relevant files includes identifying the one or more groups based on at least one of the user category property or a person who performed an action associated with the user category property.

Item 14. The method of any one of items 8-13, further comprising ranking the one or more relevant files based on their relevance to the user.

Item 15. A data processing system comprising:
  a processor; and
  a memory in communication with the processor, the memory comprising executable instructions that, when executed by, the processor, cause the data processing system to perform functions of:
  retrieving a plurality of properties for a file from a storage medium, the plurality of properties including at least one of a user category property, a user associated with the user category property, a time associated with the user category property, or a relevant activity performed on the file;
  analyzing the plurality of properties to identify one or more relevant events performed on the file;
  generating event data for at least one of the one or more relevant events; and
  providing the generated event data for presenting on a event representation for the file on a user interface of a computing device.

Item 16. The data processing system of item 15, further comprising:
  receiving a request for displaying the event representation for the file;
  determining if the request is for a user-centric event representation;
  responsive to determining that the request is for a user-centric event representation, analyzing the plurality of properties to identify one or more properties that are associated with a requesting user;
  analyzing the one or more properties associated with the requesting user to identify the relevant events performed by the requesting user; and
  generating event data for at least one of the one or more relevant events performed by the requesting user.

Item 17. The data processing system of items 15 or 16, wherein the one or more relevant events include a subset of events performed on the file.

Item 18. The data processing system of any one of items 15-17, wherein the event representation is one of a user-centric event representation and a file-centric event representation.

Item 19. The data processing system of any one of items 15-18, wherein the generated event data provided for presenting on the event representation includes information about a person associated with the at least one of the one or more relevant events and the time of the at least one of the one or more relevant events.

Item 20. The data processing system of any one of items 15-19, wherein the generated event data provided for presenting on the event representation includes information about the person's relationship to a viewer of the event representation.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by, the processor, cause the data processing system to perform functions of:
receiving a request to search for one or more files that are relevant to a first user;
in response to receiving the request, retrieving a user data signal including user-specific data for identifying one or more relevant files, the user data signal including information about a plurality of users' relationship with the one or more files, a plurality of users including the first user and one or more other users;
identifying the one or more relevant files in a storage medium based on the user data signal and at least one of a user category property, a lifecycle stage property, a relevant activity property, or an activity level property of a plurality of files stored in the storage medium;
organizing the one or more relevant files into groups, via a machine-learning model, by using the user category property to identify a task performed by the one or more users on the one or more relevant files, by identifying a user, from among the one or more users, who performed the task, and by determining the identified user's relationship to the first user and dynamically organizing the one or more relevant files into groups based on the task and the user's relationship to the first user; and
providing for display data relating to the groups,
wherein the user category property is determined by:
receiving data relating to a plurality of activities performed by the one or more other users on each of the one or more files within a specific time period; and
analyzing the data to identify a category of user activity based on a type of activity performed on one of the one or more files during the specific time period, and
wherein the identified category is stored as metadata for each of the one or more files.

2. The data processing system of claim 1, wherein the user-specific data includes at least one of one or more persons, one or more groups, and one or more entities associated with the first user.

3. The data processing system of claim 2, wherein the user-specific data further includes a relationship between the one or more persons, the one or more groups and the one or more entities and the first user.

4. The data processing system of claim 1, wherein the memory further includes executable instructions that, when executed by, the processor, cause the processor to perform a function of ranking the one or more relevant files based on their relevance to the first user.

5. The data processing system of claim 1, wherein the memory further includes executable instructions that, when executed by, the processor, cause the processor to perform a function of identifying the one or more relevant files based on at least one of the user category property and a person who performed an action associated with the user category property.

6. The data processing system of claim 1, wherein the one or more relevant files are further identified based on a recency of activity performed on the one or more relevant files.

7. A method for intelligently organizing groups of relevant files comprising:
receiving a request to search for one or more files that are relevant to a first user;
in response to receiving the request, retrieving a user data signal including user-specific data for identifying one or more relevant files, the user data signal including information about a plurality of users' relationship with the one or more files, a plurality of users including the first user and one or more other users;
identifying the one or more relevant files in a storage medium based on the user data signal and at least one of a user category property, a lifecycle stage property, a relevant activity property, or an activity level property of a plurality of files stored in the storage medium;
organizing the one or more relevant files into the groups, via a machine-learning model, by using the user category property to identify a task performed by the one or more users on the one or more relevant files, by identifying a user, from among the one or more users, who performed the task, and by determining the identified user's relationship to the first user and dynamically organizing the one or more relevant files into groups based on the task and the user's relationship to the first user; and
providing for display data relating to the groups,
wherein the user category property is determined by:
receiving data relating to a plurality of activities performed by the one or more other users on each of the one or more files within a specific time period; and
analyzing the data to identify a category of user activity based on a type of activity performed on one of the one or more files during the specific time period, and
wherein the identified category is stored as metadata for each of the one or more files.

8. The method of claim 7, wherein the user-specific data includes at least one of one or more persons, one or more groups, and one or more entities associated with the first user.

9. The method of claim 8, wherein the user-specific data further includes a relationship between the one or more persons, the one or more groups and the one or more entities and the first user.

10. The method of claim 9, wherein the one or more relevant files are further identified based on at least one of the one or more persons, the one or more groups, the one or more entities, or the relationship between the one or more persons, the one or more groups or the one or more entities and the first user.

11. The method of claim 7, wherein the one or more relevant files are further identified based on a recency of activity performed one the one or more relevant files.

12. The method of claim 7, wherein organizing the one or more relevant files into the groups of relevant files includes identifying the groups based on at least one of the user category property or a person who performed an action associated with the user category property.

13. The method of claim 7, further comprising ranking the one or more relevant files based on their relevance to the first user.

14. A non-transitory computer readable medium on which are stored instructions that, when executed by an operating system, cause a programmable device to perform operations of:
receiving a request to search for one or more files that are relevant to a first user;
in response to receiving the request, retrieving a user data signal including user-specific data for identifying one or more relevant files, the user data signal including information about a plurality of users' relationship with the one or more files, a plurality of users including the first user and one or more other users;
identifying the one or more relevant files in a storage medium based on the user data signal and at least one of a user category property, a lifecycle stage property, a relevant activity property, or an activity level property of a plurality of files stored in the storage medium;
organizing the one or more relevant files into groups, via a machine-learning model, by using the user category property to identify a task performed by the one or more users on the one or more relevant files, by identifying a user, from among the one or more users, who performed the task, and by determining the identified user's relationship to the first user and dynamically organizing the one or more relevant files into groups based on the task and the user's relationship to the first user; and
providing for display data relating to the groups, wherein the user category property is determined by:
receiving data relating to a plurality of activities performed by the one or more other users on each of the one or more files within a specific time period; and
analyzing the data to identify a category of user activity based on a type of activity performed on one of the one or more files during the specific time period, and
wherein the identified category is stored as metadata for each of the one or more file.

15. The non-transitory computer readable medium of claim 14, wherein the user-specific data includes at least one of one or more persons, one or more groups, and one or more entities associated with the first user.

16. The non-transitory computer readable medium of claim 15, wherein the user-specific data further includes a relationship between the one or more persons, the one or more groups and the one or more entities and the first user.

17. The non-transitory computer readable medium of claim 14, wherein the instructions further cause the programmable device to perform an operation of ranking the one or more relevant files based on their relevance to the first user.

18. The non-transitory computer readable medium of claim 14, wherein the instructions further cause the programmable device to perform an operation of identifying the one or more relevant files based on at least one of the user category property and a person who performed an action associated with the user category property.

19. The non-transitory computer readable medium of claim 14, wherein the one or more relevant files are further identified based on a recency of activity performed on the one or more relevant files.

* * * * *